US007209117B2

(12) United States Patent
Rosenberg et al.

(10) Patent No.: US 7,209,117 B2
(45) Date of Patent: *Apr. 24, 2007

(54) METHOD AND APPARATUS FOR STREAMING FORCE VALUES TO A FORCE FEEDBACK DEVICE

(75) Inventors: Louis B. Rosenberg, Pleasanton, CA (US); Adam C. Braun, Sunnyvale, CA (US)

(73) Assignee: Immersion Corporation, San Jose, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 10/730,067

(22) Filed: Dec. 9, 2003

(65) Prior Publication Data

US 2004/0113932 A1      Jun. 17, 2004

Related U.S. Application Data

(60) Continuation of application No. 09/618,966, filed on Jul. 19, 2000, now Pat. No. 6,661,403, which is a division of application No. 09/322,245, filed on May 28, 1999, now Pat. No. 6,278,439, which is a continuation of application No. 08/747,841, filed on Nov. 13, 1996, now Pat. No. 5,959,613, which is a continuation-in-part of application No. 08/566,282, filed on Dec. 1, 1995, now Pat. No. 5,734,373.

(51) Int. Cl.
    *G09G 5/00* (2006.01)

(52) U.S. Cl. .................. 345/156; 345/161; 715/701

(58) Field of Classification Search ........ 345/156–158, 345/161, 163, 169; 715/701, 702

See application file for complete search history.

(56) References Cited

U.S. PATENT DOCUMENTS

| 2,832,073 | A | 4/1958 | Arkus et al. |
| 2,906,179 | A | 9/1959 | Bower |
| 2,972,140 | A | 2/1961 | Hirsch |
| 3,157,853 | A | 11/1964 | Hirsch |

(Continued)

FOREIGN PATENT DOCUMENTS

EP      0 349 086 A1      1/1990

(Continued)

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

(Continued)

*Primary Examiner*—Regina Liang
(74) *Attorney, Agent, or Firm*—Thelen Reid Brown Raysman & Steiner LLP

(57) ABSTRACT

A method and apparatus for shaping force signals for a force feedback device. A source wave is provided and is defined by a set of control parameters (including a steady state magnitude, a frequency value and a duration value) and modified by a set of impulse parameters (including an impulse magnitude, and a settle time representing a time required for the impulse magnitude to change to the steady-state magnitude). Optionally, application parameters specifying a direction of force signal and trigger parameters specifying activating buttons can also be provided for the source wave. Using a host processor or a local processor, the force signal is formed from the source wave and the sets of control parameters and impulse parameters, where the force signal includes an impulse signal followed by a continual steady-state signal after an expiration of the settle time. A feel sensation is generated to a user of the force feedback device as physical forces produced by actuators on the force feedback device in response to the force signal. The steady-state magnitude value is lower than a magnitude value of a non-impulse-shaped force signal required to create a corresponding feel sensation having a similar apparent sensation to the user.

33 Claims, 10 Drawing Sheets

U.S. PATENT DOCUMENTS

| | | |
|---|---|---|
| 3,220,121 A | 11/1965 | Cutler |
| 3,490,059 A | 1/1970 | Paulsen et al. |
| 3,497,668 A | 2/1970 | Hirsch |
| 3,517,446 A | 6/1970 | Corlyon et al. |
| 3,531,868 A | 10/1970 | Stevenson |
| 3,623,064 A | 11/1971 | Kagan |
| 3,659,284 A | 4/1972 | Rusch |
| 3,863,098 A | 1/1975 | Mehr |
| 3,875,488 A | 4/1975 | Crocker et al. |
| 3,890,958 A | 6/1975 | Fister et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,944,798 A | 3/1976 | Eaton |
| 4,125,800 A | 11/1978 | Jones |
| 4,127,752 A | 11/1978 | Lowthorp |
| 4,148,014 A | 4/1979 | Burson |
| 4,160,508 A | 7/1979 | Salisbury, Jr. |
| 4,216,467 A | 8/1980 | Colston |
| 4,236,325 A | 12/1980 | Hall et al. |
| 4,262,549 A | 4/1981 | Schwellenbach |
| 4,333,070 A | 6/1982 | Barnes |
| 4,374,399 A | 2/1983 | Ensinger |
| 4,398,889 A | 8/1983 | Lam et al. |
| 4,448,083 A | 5/1984 | Hayashi |
| 4,464,117 A | 8/1984 | Foerst |
| 4,477,043 A | 10/1984 | Repperger |
| 4,477,973 A | 10/1984 | Davies |
| 4,484,191 A | 11/1984 | Vavra |
| 4,513,235 A | 4/1985 | Acklam et al. |
| 4,550,221 A | 10/1985 | Mabusth |
| 4,550,617 A | 11/1985 | Fraignier et al. |
| 4,560,983 A | 12/1985 | Williams |
| 4,571,834 A | 2/1986 | Fraser et al. |
| 4,581,491 A | 4/1986 | Boothroyd |
| 4,593,470 A | 6/1986 | Davies |
| 4,599,070 A | 7/1986 | Hladky et al. |
| 4,601,206 A | 7/1986 | Watson |
| 4,604,016 A | 8/1986 | Joyce |
| 4,632,341 A | 12/1986 | Repperger et al. |
| 4,638,798 A | 1/1987 | Shelden et al. |
| 4,653,011 A | 3/1987 | Iwano |
| 4,654,648 A | 3/1987 | Herrington et al. |
| 4,676,002 A | 6/1987 | Slocum |
| 4,679,331 A | 7/1987 | Koontz |
| 4,688,983 A | 8/1987 | Lindbom |
| 4,703,443 A | 10/1987 | Moriyasu |
| 4,704,909 A | 11/1987 | Grahn et al. |
| 4,708,656 A | 11/1987 | de Vries et al. |
| 4,713,007 A | 12/1987 | Alban |
| 4,750,487 A | 6/1988 | Zanetti |
| 4,769,763 A | 9/1988 | Trieb et al. |
| 4,787,051 A | 11/1988 | Olson |
| 4,791,934 A | 12/1988 | Brunnett |
| 4,794,392 A | 12/1988 | Selinko |
| 4,798,919 A | 1/1989 | Miessler et al. |
| 4,800,721 A | 1/1989 | Cemenska et al. |
| 4,803,413 A | 2/1989 | Kendig et al. |
| 4,811,608 A | 3/1989 | Hilton |
| 4,819,195 A | 4/1989 | Bell et al. |
| 4,839,838 A | 6/1989 | LaBiche et al. |
| 4,849,692 A | 7/1989 | Blood |
| 4,879,556 A | 11/1989 | Duimel |
| 4,885,565 A | 12/1989 | Embach |
| 4,888,877 A | 12/1989 | Enderle et al. |
| 4,891,764 A | 1/1990 | McIntosh |
| 4,891,889 A | 1/1990 | Tomelleri |
| 4,907,970 A | 3/1990 | Meenen, Jr. |
| 4,907,973 A | 3/1990 | Hon |
| 4,930,770 A | 6/1990 | Baker |
| 4,934,694 A | 6/1990 | McIntosh |
| 4,942,545 A | 7/1990 | Sapia |
| 4,945,305 A | 7/1990 | Blood |
| 4,945,501 A | 7/1990 | Bell et al. |
| 4,949,119 A | 8/1990 | Moncrief et al. |
| 4,961,138 A | 10/1990 | Gorniak |
| 4,961,267 A | 10/1990 | Herzog |
| 4,962,591 A | 10/1990 | Zeller et al. |
| 4,970,720 A | 11/1990 | Esaki |
| 4,982,504 A | 1/1991 | Soderberg et al. |
| 4,983,786 A | 1/1991 | Stevens et al. |
| 5,007,085 A | 4/1991 | Greanias et al. |
| 5,007,300 A | 4/1991 | Siva |
| 5,012,231 A | 4/1991 | Felsenstein |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,040,306 A | 8/1991 | McMurtry et al. |
| 5,044,956 A | 9/1991 | Behensky et al. |
| 5,050,608 A | 9/1991 | Watanabe et al. |
| 5,072,361 A | 12/1991 | Davis et al. |
| 5,078,152 A | 1/1992 | Bond et al. |
| 5,088,046 A | 2/1992 | McMurtry et al. |
| 5,088,055 A | 2/1992 | Oyama |
| 5,095,303 A | 3/1992 | Clark et al. |
| 5,103,404 A | 4/1992 | McIntosh |
| 5,107,080 A | 4/1992 | Rosen |
| 5,116,051 A | 5/1992 | Moncrief et al. |
| 5,126,948 A | 6/1992 | Mitchell et al. |
| 5,128,671 A | 7/1992 | Thomas, Jr. |
| 5,131,844 A | 7/1992 | Marinaccio et al. |
| 5,132,672 A | 7/1992 | Clark |
| 5,139,261 A | 8/1992 | Openiano |
| 5,142,506 A | 8/1992 | Edwards |
| 5,142,931 A | 9/1992 | Menahem |
| 5,143,505 A | 9/1992 | Burdea et al. |
| 5,148,377 A | 9/1992 | McDonald |
| 5,153,884 A | 10/1992 | Lucak et al. |
| 5,165,897 A | 11/1992 | Johnson |
| 5,175,459 A | 12/1992 | Danial et al. |
| 5,178,012 A | 1/1993 | Culp |
| 5,181,181 A | 1/1993 | Glynn |
| 5,182,557 A | 1/1993 | Lang |
| 5,184,306 A | 2/1993 | Erdman et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,187,874 A | 2/1993 | Takahashi et al. |
| 5,189,806 A | 3/1993 | McMurtry et al. |
| 5,197,003 A | 3/1993 | Moncrief et al. |
| 5,203,563 A | 4/1993 | Loper, III |
| 5,204,824 A | 4/1993 | Fujimaki |
| 5,209,131 A | 5/1993 | Baxter |
| 5,212,473 A | 5/1993 | Louis |
| 5,220,260 A | 6/1993 | Schuler |
| 5,223,776 A | 6/1993 | Radke et al. |
| 5,228,356 A | 7/1993 | Chuang |
| 5,230,623 A | 7/1993 | Guthrie et al. |
| 5,240,417 A | 8/1993 | Smithson et al. |
| 5,243,266 A | 9/1993 | Kasagami et al. |
| 5,251,127 A | 10/1993 | Raab |
| 5,251,156 A | 10/1993 | Heier et al. |
| 5,259,120 A | 11/1993 | Chapman et al. |
| 5,259,894 A | 11/1993 | Sampson |
| 5,262,777 A | 11/1993 | Low et al. |
| 5,264,768 A | 11/1993 | Gregory et al. |
| 5,271,290 A | 12/1993 | Fischer |
| 5,275,174 A | 1/1994 | Cook |
| 5,275,565 A | 1/1994 | Moncrief |
| 5,283,970 A | 2/1994 | Aigner |

| | | |
|---|---|---|
| 5,289,273 A | 2/1994 | Lang |
| 5,296,846 A | 3/1994 | Ledley |
| 5,296,871 A | 3/1994 | Paley |
| 5,299,810 A | 4/1994 | Pierce et al. |
| 5,309,140 A | 5/1994 | Everett, Jr. et al. |
| 5,334,027 A | 8/1994 | Wherlock |
| 5,351,692 A | 10/1994 | Dow et al. |
| 5,354,162 A | 10/1994 | Burdea et al. |
| 5,379,663 A | 1/1995 | Hara |
| 5,384,460 A | 1/1995 | Tseng |
| 5,389,865 A | 2/1995 | Jacobus et al. |
| 5,396,266 A | 3/1995 | Brimhall |
| 5,396,267 A | 3/1995 | Bouton |
| 5,397,323 A | 3/1995 | Taylor et al. |
| 5,402,582 A | 4/1995 | Raab |
| 5,405,152 A | 4/1995 | Katanics et al. |
| 5,412,880 A | 5/1995 | Raab |
| 5,414,337 A | 5/1995 | Schuler |
| 5,417,696 A | 5/1995 | Kashuba et al. |
| 5,428,748 A | 6/1995 | Davidson et al. |
| 5,429,140 A | 7/1995 | Burdea et al. |
| 5,436,542 A | 7/1995 | Petelin et al. |
| 5,436,622 A | 7/1995 | Gutman et al. |
| 5,436,640 A | 7/1995 | Reeves |
| 5,437,607 A | 8/1995 | Taylor |
| 5,445,166 A | 8/1995 | Taylor |
| 5,451,924 A | 9/1995 | Massimino et al. |
| 5,456,341 A * | 10/1995 | Garnjost et al. ............ 188/378 |
| 5,459,382 A | 10/1995 | Jacobus et al. |
| 5,466,213 A | 11/1995 | Hogan et al. |
| 5,467,763 A | 11/1995 | McMahon et al. |
| 5,482,051 A | 1/1996 | Reddy et al. |
| 5,512,919 A | 4/1996 | Araki |
| 5,513,100 A | 4/1996 | Parker et al. |
| 5,517,507 A | 5/1996 | Needham et al. |
| 5,547,382 A | 8/1996 | Yamasaki et al. |
| 5,551,701 A | 9/1996 | Bouton et al. |
| 5,570,111 A | 10/1996 | Barrett et al. |
| 5,575,761 A | 11/1996 | Hajianpour |
| 5,576,727 A | 11/1996 | Rosenberg et al. |
| 5,587,937 A | 12/1996 | Massie et al. |
| 5,589,828 A | 12/1996 | Armstrong |
| 5,589,854 A | 12/1996 | Tsai |
| 5,591,924 A | 1/1997 | Hilton |
| 5,623,582 A | 4/1997 | Rosenberg |
| 5,625,576 A | 4/1997 | Massie et al. |
| 5,629,594 A | 5/1997 | Jacobus et al. |
| 5,634,794 A | 6/1997 | Hildreth et al. |
| 5,642,469 A | 6/1997 | Hannaford et al. |
| 5,643,087 A | 7/1997 | Marcus et al. |
| 5,656,901 A | 8/1997 | Kurita |
| 5,666,473 A | 9/1997 | Wallace |
| 5,680,322 A | 10/1997 | Shinoda |
| 5,690,582 A | 11/1997 | Ulrich et al. |
| 5,691,898 A | 11/1997 | Rosenberg et al. |
| 5,694,013 A | 12/1997 | Stewart et al. |
| 5,696,535 A | 12/1997 | Rutledge et al. |
| 5,709,219 A | 1/1998 | Chen et al. |
| 5,721,566 A | 2/1998 | Rosenberg et al. |
| 5,731,804 A | 3/1998 | Rosenberg |
| 5,734,373 A | 3/1998 | Rosenberg et al. |
| 5,739,811 A | 4/1998 | Rosenberg et al. |
| 5,742,278 A | 4/1998 | Chen et al. |
| 5,754,754 A | 5/1998 | Dudley et al. |
| 5,755,577 A | 5/1998 | Gillio |
| 5,766,016 A | 6/1998 | Sinclair et al. |
| 5,767,839 A | 6/1998 | Rosenberg |
| 5,785,630 A | 7/1998 | Bobick et al. |
| 5,790,108 A | 8/1998 | Salcudean et al. |
| 5,802,353 A | 9/1998 | Avila et al. |
| 5,812,554 A | 9/1998 | Kadambi et al. |
| 5,854,786 A | 12/1998 | Henderson et al. |
| 5,889,670 A | 3/1999 | Schuler et al. |
| 5,897,437 A | 4/1999 | Nishiumi et al. |
| 5,959,613 A | 9/1999 | Rosenberg et al. |
| 5,968,197 A | 10/1999 | Doiron |
| 5,990,875 A | 11/1999 | Bi et al. |
| 6,111,577 A | 8/2000 | Zilles et al. |
| 6,160,489 A | 12/2000 | Perry et al. |
| 6,278,439 B1 | 8/2001 | Rosenberg et al. |
| 6,300,937 B1 | 10/2001 | Rosenberg |
| 6,422,941 B1 | 7/2002 | Thorner et al. |
| 6,906,700 B1 | 6/2005 | Armstrong |
| 2002/0030663 A1 | 3/2002 | Tierling et al. |

FOREIGN PATENT DOCUMENTS

| | | |
|---|---|---|
| EP | 0626634 A2 | 11/1994 |
| GB | 2254911 | 10/1992 |
| JP | H2-185278 | 7/1990 |
| JP | H4-8381 | 1/1992 |
| JP | 034610 | 2/1992 |
| JP | H5-192449 | 8/1993 |
| JP | H7-24147 | 1/1995 |
| WO | WO 9502801 | 1/1995 |
| WO | WO 9532459 | 11/1995 |
| WO | WO 9642078 | 12/1996 |
| WO | WO 9712357 | 4/1997 |
| WO | WO 9720305 | 6/1997 |
| WO | WO 9721160 | 6/1997 |
| WO | WO 9731333 | 8/1997 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Ouput Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, Archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Sybsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Eposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," PRESENCE, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Comporation, Revised Jul. 15, 1980 (23 pages).

SCANNELL "Taking a Joystick Ride," *Computer Currents*, Boston Edition, vol. 9, No. 11, Nov. 1994.

ROSENBERG, "Virtual Fixtures: Perceptual Overlays Enhance Operator Performance in Telepresence Tasks," *Ph.D. Dissertation*, Stanford University, Jun. 1994.

Cursor Walso, "Designer's Corner-Useful Technology for Your Idea File," Design News, Mar. 7, 1993, p. 63.
"Foot-Operated Mouse," IBM Technical Disclosure Bulletin, Apr. 1986, vol. 28, No. 11.
"High Performance Model of the Immersion Probe," Immersion Probe-Md.TM., Immersion Human Interface Corporation.
"High Performance Model of the Immersion Probe." Immersion Probe-MD™, Immersion Corporation (1994).
"Proceedings of the IFIP Congress 65, " International Federation for Information Processing, Information Processing 1965, vol. 3, New York, May 24-29, 1965, pp. 506.
"The Personal Digitizer.TM.," Immersion Human Interface Corporation 1994.
"Useful Technology for Your Idea File," Design News, Mar. 7, 1994, pp. 63.
3D Human Interface Tool, Immersion Probe.TM., Immersion Human Interface Corporation 1994.
Adachi, Yoshitaka et al., "Sensory Evaluation of Virtual Haptic Push-Buttons," Technical Research Center, Suzuki Motor Corporation, Nov. 1994.
Adelstein Bernard D. et al., "A High Performance Two Degree-of-Freedom Kinesthetic Interface," Massachusetts Institute of Technology 1992, pp. 108-112.
Atkinston, William D. et al, "Computing with Feeling," Comput. & Graphics, vol. 2, No. 2-E, pp. 97-103.
Batter, James J. et al., "Grope-1: A Computer Display to the Sense of Feel," pp. TA-4-188-TA-4-192.
Bejczy, Antal K., "The Phantom Robot: Predictive Displays for Teleoperation with Time Delay," IEEE 1990, pp. 546-550.
Burdea, Grigore et al., "A Portable Dextrous Master with Force Feedback," Presence: Teleoperators and Virtual Enviroments, MIT Press, Jun. 1991.
Burdea, Grigore et al., "Dextrous Telerobotics with Force Feedback-An Overview," Robotica 1991, vol. 9.
Buttolo, Pietro et al., "Pen-Based Force Display for Precision Manipulation in Virtual Environments," IEEE Mar. 1995, pp. 1-8.
Colgate J. Edward et al., Implementation of Stiff Virtual Walls in Force-Reflecting Interfaces, Sep. 22, 1993.
Ellis, R.E. et al., "Design and Evaluation of a High-Performance Prototype Planar Haptic Interface," ASME Dec. 3, 1993, DSC-vol. 49, pp. 55-64.
Fischer, Patrick et al., "Specification and Design of Input Devices for Teleoperation," 1990.
Fisher, S.S. et al., "Virtual Environment Display System," ACM Interactive 3D Graphics, Oct. 1986.
Gotow, J.K., et al., "Preception of Mechanical Properties at the Man-Machine Interface," IEEE 1987, pp. 688-689.
Hannaford, Blake et al., "Performance Evaluation of a Six-Axis Generalized Force-Reflecting Teleoperator," IEEE May/Jun. 1991, vol. 21, No. 3, pp. 620-633.
Hasser, Christopher John, "Tactile Feedback for a Force-Reflecting Haptic Display," The School of Engineering, University of Dayton, Dec. 1995, pp. iii-xii & 1-96.
Herndon, J.N. et al., "The State-of-the-Art Model M-2 Maintenance System," Proceedings of the 1984 National Topical Meeting on Robotics and Remote Handling in Hostile Environments, American Nuclear Society, pp. 59-65.
Howe, Robert D., "Task Performance with a Dextrous Teleoperated Hand System," Proceedings of SPIE, Nov. 1992, vol. 1833, pp. 1-9.

Iwata, H., "Artificial Reality with Force Feedback: Development of Desktop Virtual Space with Compact Master Manipulator," Computer Graphics, vol. 24, No. 4, 1990, pp. 165-170.
Iwata, Hiroo et al, Volume Haptization, IEEE 1993, pp. 16-18.
Jacobsen, S.C. et al., "High Performance, High Dexterity, Force Reflective Teleoperator II," ANS Topical Meeting on Robotics & Remote Systems, Albuquerque, New Mexico Feb. 24-27, 1991, pp. 1-10.
Kelley, A.J. et al., "MagicMouse: Tactile and Kinesthetic Feedback in the Human-Computer Interface Using an Electromagnetically Actuated Input/Output Device," Dept. of Elec. Engineering, Univ. of British Columbia, 1993, pp. 1-27.
Kilpatrick, Paul Jerome, 1947, "The Use of a Kinesthetic Supplement in an Interactive Graphics System", Xerox University Microfilms, Ann Arbor, Michigan 48106, 1976, pp. 1-175.
Kim, Won S. et al., "Graphics Displays for Operator Aid in Telemanipulation," IEEE 1991, pp. 1059-1067.
Kim, Won S. et al., A Teleoperation Training Simulator with Visual and Kinesthetic Force Virtual Reality.
Kotoku, Tetsuo et al., "Environment Modeling for the Interactive Display (EMID) Used In Telerobotic Systems," IEEE Nov. 3-5, 1991, pp. 99-1004.
Kotoku, Tetsuo, "A Predictive Display with Force Feedback and its Application to Remote Manipulation System with Transmission Time Display," IEEE 1992, Jul. 7-10, 1992, pp. 239-246.
Krueger, Myron W., Artificial Reality 1988, pp. 54-75.
Meyer, Kenneth et al., "A Survey of Position Trackers," The Massachusetts Institute of Technology 1992, Presence, vol. 1, No. 2.
Minsky, Margaret et al., "Feeling and Seeing: Issues in Force Display," ACM 1990, pp. 235-242.
Noll, A. Michael, "Man-Machine Tactile Communication Dissertation," Polytechnic Institute of Brooklyn, Jun. 1971, pp. 1-88.
Ouh-young, M. et al., "Creating an Illusion of Feel: Control Issues in Force Display," Computer Science Dept., Univ. of North Carolina, 1989, pp. 1-14.
Ouh-young, Ming et al., "Force Display Performs Better than Visual Display in a Simple 6-D Docking Task," IEEE 1989, pp. 1462-1466.
Ouh-Young, Ming et al., "Using a Manipulator for Force Display in Molecular Docking," IEEE 1988, pp. 1824-1829.
Repperger, D.W., "Active Force Reflection Devices in Teleoperation", IEEE Control Systems, 1991, pp. 52-56.
Rosenberg et al., "The use of force feedback to enhance graphical user interfaces," Stereoscopic Displays and Virtual Reality Systems III, Proc. SPIE 2653, 1996, pp. 243-248.
Rosenberg, L.B., "Commercially Viable Force Feedback Controller for Individuals with Neuromotor Disabilities", AL/CF-TR-1997-0016, United States Air Force Armstron Laboratory, May 1996.
Rosenberg, Louis B. et al., "Perceptual Decompostion of Virtual Haptic Surfaces," IEEE, Oct. 1993.
Rosenberg, Louis B., "Perceptual Design of a Virtual Rigid Surface Contact," Center for Design Research Stanford University, Air Force Material Command, Apr. 1993, pp. 1-41.

Rosenberg, Louis B., "The Use of Virtual Fixtures as Perceptual Overlays to Enhance Operator Performance in Remote Environments," Air Force Material Command, Sep. 1992, pp. 1-42.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Rosenberg, Louis B., Crew Systems Directorate Biodynamics and Biocommunications Division Wright-Patterson, Air Force Material Command, Mar. 1993, pp. 1-45.

Rosenberg, Louis B., The Use of Virtual Fixtures to Enhance Operator Performance in Time Delayed Teleoperation, Armstron Laboratory, Mar. 1993, pp. 1-45.

Schmult, Brian et al., "Application Areas for a Force-Feedback Joystick," ASME 1993, DSC-vol. 49, pp. 47-54.

Smith, Geoffrey, "Call It Palpable Progress," Business Week, Oct. 9, 1995, pp. 93, 96.

Snow, E. et al., "Compact Force-Reflecting Hand Controller," JPL, Apr. 1991, vol. 15, No. 3, Item No. 153, pp. 1-15a.

Su, S. Augustine et al., "The Virtual Panel Architecture: A 3D Gesture Framework," IEEE 1993, pp. 387-393.

Tan, H. et al., "Manual Resolution of Compliance When Work and Force Cues are Minimized," ASME 1993, DSC—vol. 49, pp. 99-104.

Tan, Hong Z. et al., "Human Factors for the Design of Force-Reflecting Haptic Interfaces," Tan, Srinivasan, Eberman, & Chang, ASME WAM 1994, pp. 1-11.

Tavkhelidze, D.S. "Kinematic Analysis of Five-Link Spherical Mechanisms," Mechanism and Machine Theory 1974, vol. 9, pp. 181-190.

Wilker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708-712.

Winey III, Calvin Mccoy,"Computer Simulated Visual and Tacticle Feedback as an Aid to Manipulator and Vehicle Control," MIT, Jun. 1981.

Yamakita, M. et al., Tele-Virtual Reality of Dynamic Mechanical Model, IEEE Jul. 7-10, 1992, pp. 1103-1110.

Yokokohji, Y., "What You Can See is What You Can Feel—Development of a Visual/Haptic Interface to Virtual Environment," Proc. of VRAIS '96, IEEE 0-8186-7295-1, 1996, pp. 46-54.

* cited by examiner

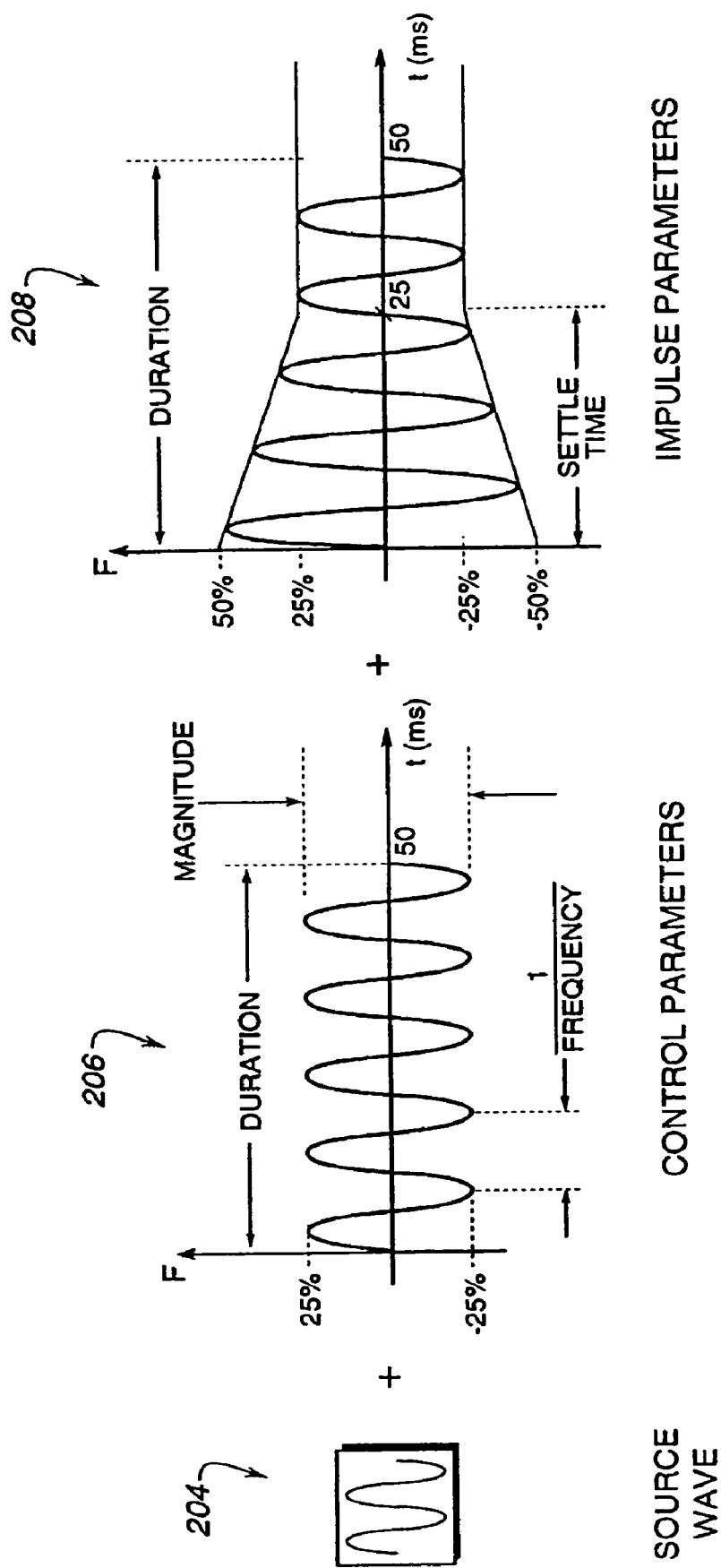

METHOD AND APPARATUS FOR STREAMING FORCE VALUES TO A FORCE FEEDBACK DEVICE

CROSS REFERENCE TO RELATED APPLICATIONS

This is a continuation application of prior U.S. application Ser. No. 09/618,966, filed on Jul. 19, 2000, now U.S. Pat. No. 6,661,403; which is a divisional of prior U.S. application Ser. No. 09/322,245, filed on May 28, 1999, now U.S. Pat. No. 6,278,439; which is a continuation of prior U.S. application Ser. No. 08/747,841, filed on Nov. 13, 1996, now U.S. Pat. No. 5,959,613; which is a continuation-in-part of prior U.S. application Ser. No. 08/566,282, filed on Dec. 1, 1995, now U.S. Pat. No. 5,734,373; and all of which are incorporated herein by reference.

BACKGROUND OF THE INVENTION

The present invention relates generally to interface devices between humans and computers, and more particularly to computer interface devices that provide force feedback to the user.

Computer systems are used extensively in many different industries to implement computer controlled simulations, games, and other application programs. More particularly, these types of games and simulations are very popular with the mass market of home consumers. A computer system typically displays a visual environment to a user on a display screen or other visual output device. Users can interact with the displayed environment to play a game, experience a simulation or virtual reality environment, or otherwise influence events or images depicted on the screen. Such user interaction can be implemented through the use of a human-computer interface device, such as a joystick, "joypad" button controller, mouse, trackball, stylus and tablet, or the like, that is connected to the computer system controlling the displayed environment. The computer updates the simulation or game in response to the user's manipulation of an object such as a joystick handle or mouse, and provides feedback to the user utilizing the display screen and, typically, audio speakers.

In some interface devices, tactile and/or haptic feedback is also provided to the user, more generally known as "force feedback." These types of interface devices can provide physical sensations to the user manipulating a user manipulable object of the interface device. For example, the Force-FX controller from CH Products, Inc. and Immersion Corporation may be connected to a computer and provides forces to a user of the controller. Typically, motors or other actuators are coupled to the user object and are connected to the controlling computer system. The computer system can provide forces on the object in conjunction with simulation/ game events by sending control signals to the actuators. The computer system can thus convey physical force sensations to the user in conjunction with other supplied feedback as the user is grasping or contacting the object of the interface device. Force feedback interface devices can thus provide a whole new modality for human-computer interaction.

Force feedback input/output (I/O) devices of the prior art have concentrated on providing maximum haptic fidelity, i.e., the realism of the tactile feedback was desired to be optimized. This is because most of the force feedback devices have been targeted at the specific needs of highly industrial applications, and not a mass consumer market. To attain such realism, mass market design concerns have been sacrificed in the prior art.

One consumer market design concern that is always present in force feedback devices is the size, weight, and power consumption of actuators included in the device. To provide realistic high magnitude forces, large and heavy actuators have necessarily been used in non-mass-market force feedback devices of the prior art. However, in the consumer market, such large and heavy actuators are a major drawback, since consumers would prefer a portable, small interface device that can easily fit on a desktop or other small working space. Even more significantly, such large actuators prevent producing a force feedback interface device at a low enough cost to be acceptable to mass market consumers. In the prior art, however, smaller actuators were not an option if realistic forces were to be presented to the user.

Some mass market force feedback devices of the prior art, nevertheless, have been provided, and these devices typically include small actuators to reduce costs. However, force feedback devices with small actuators have a problem in that they may not allow the superposition of many types of force effects due to a limited dynamic range available from the actuators. For example, if a jolt feel sensation is desired to be superimposed on a vibration feel sensation to the user, then the force magnitudes of the two feel sensations are added together. However, if the maximum available dynamic range of the actuators is small, as is typically the case for mass market force feedback devices, then the realism of the feel sensations must be sacrificed in some way to accommodate both feel sensations. For example, the jolt sensation would have to be reduced in magnitude, thus reducing the effectiveness of that feel sensation to the user. Providing actuators with a greater dynamic range typically means providing larger, more expensive actuators, which is not usually feasible in the consumer market as explained above.

In addition, there is unnecessary complexity in the manipulation of force feedback signals in the prior art. To produce a feel sensation to a user of the force feedback device, a force signal of the prior art must include all information required to realistically output that feel sensation to the user. However, the computational burden of providing feel sensations to a user can be high, especially when providing multiple simultaneous feel sensations. To adequately provide the desired forces, complex and expensive components typically must be included in the force feedback device, often pushing the cost of realistic force feedback out of the reach of mass market consumers.

SUMMARY OF THE INVENTION

The present invention is directed to providing and controlling force feedback to a user operating a human/computer interface device. Impulse-shaped force signals are provided to reduce the necessary force output from the actuators, thereby allowing smaller, less complex forces to be generated for the user with minimal reduction in the realism of generated forces.

More particularly, a method of the present invention for generating a force signal for creating a feel sensation upon a user through a force feedback device includes providing a source wave. A set of control parameters are provided to define the source wave that include at least one of a steady-state magnitude value representing a steady-state magnitude of the source wave, a frequency value representing a frequency of the source wave, and a duration value representing a duration of the feel sensation. Further, a set of impulse parameters is provided to modify the source wave, including an impulse value specifying an impulse force level of the source wave applied to the user and a settle time representing a time required for a magnitude of the force signal to change from the impulse value to the steady-state magnitude value. Finally, using a processor, the force signal is formed from the source wave and the sets of control parameters and impulse parameters. Preferably, the feel sensation is generated as physical forces produced by actuators on the force feedback device in response to the force signal. Preferably, the force signal is initially provided at the impulse value and is then decayed to the steady-state magnitude value after an expiration of the settle time. The steady-state magnitude value is lower than a magnitude value of a non-impulse-shaped force signal required to create a corresponding feel sensation having a similar apparent sensation to the user. Thus, by generating the feel sensation using the steady-state magnitude value, less power is consumed than if said non-impulse shaped force signal were used.

Optionally, a set of application parameters specifying a vector of application for the force signal, and a set of trigger parameters specifying how the feel sensation should be generated responsive to an activation of a button of said force feedback device can also be provided for the source wave. In some embodiments, a host processor of a host computer system provides the impulse-shaped force signal. In ether embodiments, a local processor is provided local to the force feedback device for provided and/or relaying the impulse-shaped force signal to actuators. The control parameters and impulse parameters can be provided to the local processor by the host processor. The host processor implements a simulation in parallel with said local processor controlling said actuators. An apparatus of the present invention similarly provides a user object movable by a user, a sensor for detecting a position of the user object, a local microprocessor, separate from said host computer system and outputting an impulse-shaped force signal, and an actuator receiving the impulse-shaped force signal and applying a force having an impulse magnitude followed by a different steady-state magnitude to the user object.

A method of the present invention for generating "condition" forces and "effect" forces for creating feel sensations upon a user through a force feedback system includes generating the conditions using a local processor to reduce a workload of a host processor. The conditions represent force signals for creating feel sensations dependent on data regarding motion or position of the user manipulatable portion of the force feedback device. This motion or position data is received by the local processor by sensors of the force feedback device. The effects can be generated using the host processor and represent force signals for creating feel sensations not dependent on the motion or position of the user manipulatable portion of the force feedback device. Alternatively, the effects can be generated using the local processor, where the force signals are generated in response to commands and parameters from the host processor, thereby further reducing the workload of the host processor.

In another aspect of the present invention, force signal data is transmitted in a force feedback system. A first force signal data value and a second force signal data value are sent in a first data packet from a host processor to a local processor. The second force signal data value and a third force signal data value are sent from the host processor to the local processor, where the third value is different from the first and second values. The second data packet and first data packet are consecutive data packets such that the "overlapped" second force signal data value may be retrieved from either the first data packet or the second data packet if either the first data packet or the second data packet is unusable after the transmission. Preferably, the local processor disregards duplicate information represented in consecutive packets if both packets are successfully received by the local processor.

The present invention advantageously provides an impulse-shaped force signal that is used to provide feel sensations to a user manipulating a force feedback device. The force signal includes an impulse of high magnitude and a steady-state force following the impulse, which provides a realistic sensation of constant force without having to continuously output a high magnitude force. That is, the present invention advantageously manipulates only those variables (impulse and steady state) of the force signal that have a significant impact on the perception of the user, reducing the complexity of the required hardware and minimizing the computational burden of representing diverse feel sensations. In addition, the local processor technology reduces the computational burden from the host processor. Furthermore, the overlapping of data in force signal transmissions reduces the computation burden of checking for errors and handshaking with a sending device. These improvements allow a computer system to provide accurate and realistic force feedback using a low-cost force feedback device and is thus ideal for the mass market of home computer systems.

These and other advantages of the present invention will become apparent to those skilled in the art upon a reading of the following specification of the invention and a study of the several figures of the drawing.

BRIEF DESCRIPTION OF THE DRAWINGS

FIG. 6 is a diagrammatic representation of an example of impulse-shaping a source wave by adding control parameters and impulse parameters;

DETAILED DESCRIPTION

Figure 1:
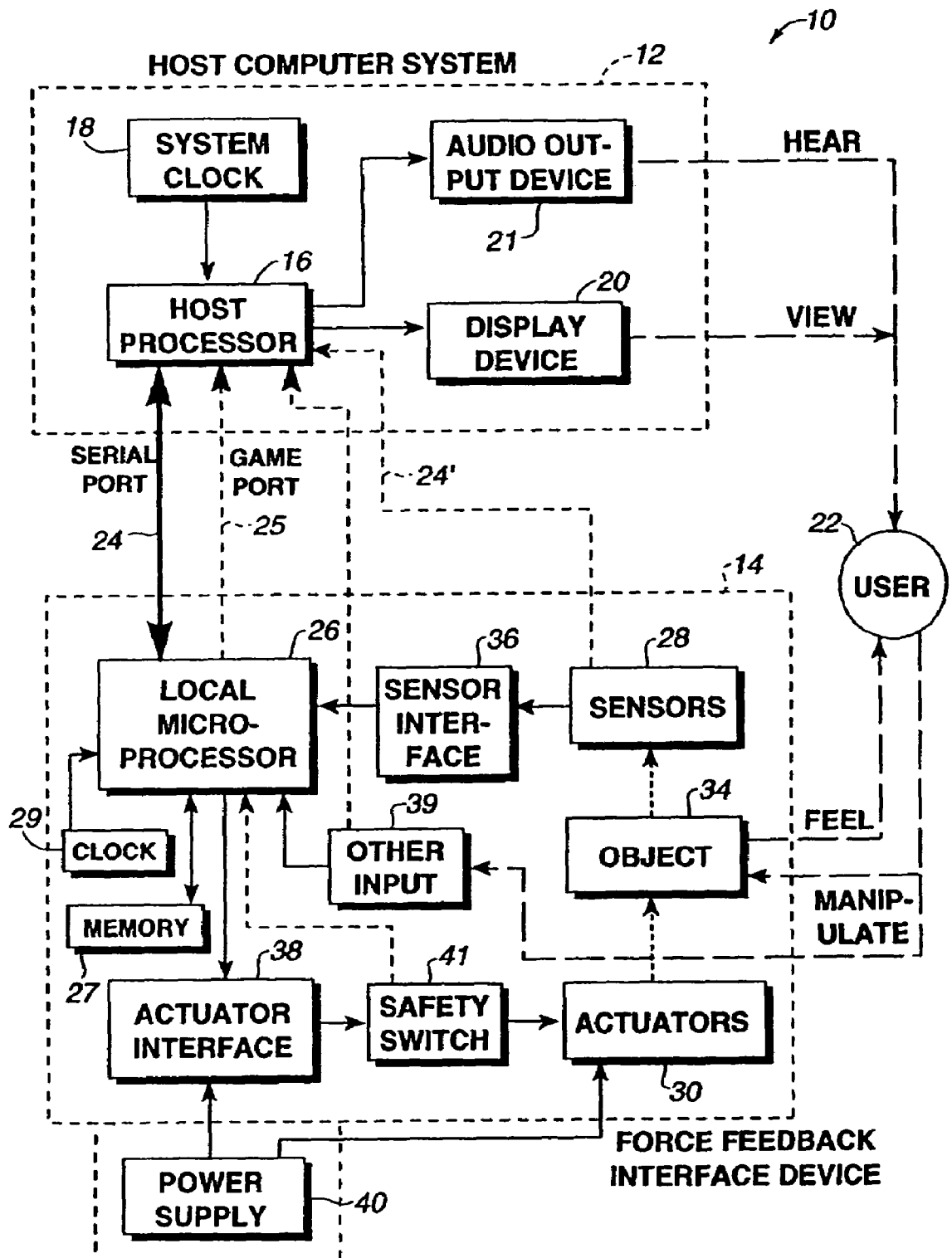
FIG. 1 is a block diagram of an interface system in accordance with the present invention for controlling a force feedback device from a host computer.

FIG. 1 is a block diagram illustrating an interface system 10 of the present invention for a force feedback interface device controlled by a host computer system. Interface system 10 includes a host computer system 12 and an interface device 14.

Host computer system 12 is preferably a personal computer, such as an IBM-compatible or Macintosh personal computer, or a workstation, such as a SUN or Silicon Graphics workstation. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a television "set top box" or a "network computer" which can be used, for example, to provide interactive computer functions to users over networks.

In the described embodiment, host computer system 12 implements a host application program with which a user 22 is interacting via peripherals and interface device 14. For example, the host application program can be a video game, medical simulation, scientific analysis program, or even an operating system or other application program that utilizes force feedback. Typically, the host application provides images to be displayed on a display output device, as described below, and/or other feedback, such as auditory signals.

Host computer system 12 preferably includes a host microprocessor 16, random access memory (RAM) 17, read-only memory (ROM) 19, input/output (I/O) electronics 21, a clock 18, a display screen 20, and an audio output device 21. Host microprocessor 16 can include a variety of available microprocessors from Intel, Motorola, or other manufacturers. Microprocessor 16 can be single microprocessor chip, or can include multiple primary and/or co-processors. Microprocessor preferably retrieves and stores instructions and other necessary data from RAM 17 and ROM 19, as is well known to those skilled in the art. In the described embodiment, host computer system 12 can receive sensor data or a sensor signal via a bus 24 from sensors of interface device, 14 and other information. Microprocessor 16 can receive data from bus 24 using I/O electronics 21, and can use I/O electronics to control other peripheral devices. Host computer system 12 can also output a "force command" to interface device 14 via bus 24 to cause force feedback for the interface device.

Clock 18 is a standard clock crystal or equivalent component used by host computer system 12 to provide timing to electrical signals used by microprocessor 16 and other components of the computer system. Clock 18 is accessed by host computer system 12 in the control process of the present invention, as described subsequently.

Display screen 20 is coupled to host microprocessor 16 by suitable display drivers and can be used to display images generated by host computer system 12 or other computer systems. Display screen 20 can be a standard display screen or CRT, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Herein, computer 12 may be referred as displaying computer "objects" or "entities". These computer objects are not physical objects, but is a logical software unit collections of data and/or procedures that may be displayed as images by computer 12 on display screen 20, as is well known to those skilled in the art. For example, a cursor or a third-person view of a car might be considered player-controlled computer objects that can be moved across the screen. A displayed, simulated cockpit of an aircraft might also be considered an "object", or the simulated aircraft can be considered a computer controlled "entity".

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by a bi-directional bus 24. The bi-directional bus sends signals in either direction between host computer system 12 and the interface device. Herein, the term "bus" is intended to generically refer to an interface such as between host computer 12 and microprocessor 26 which typically includes one or more connecting wires or other connections and that can be implemented in a variety of ways, as described below. In the preferred embodiment, bus 24 is a serial interface bus providing data according to a serial communication protocol. An interface port of host computer system 12, such as an RS232 serial interface port, connects bus 24 to host computer system 12. Other standard serial communication protocols can also be used in the serial interface and bus 24, such as RS-422, Universal Serial Bus (USB), MIDI, or other protocols well known to those skilled in the art.

For example, the USB standard provides a relatively high speed serial interface that can provide force feedback signals in the present invention with a high degree of realism. USB can also source more power to drive peripheral devices. Since each device that accesses the USB is assigned a unique USB address by the host computer, this allows multiple devices to share the same bus. In addition, the USB standard includes timing data that is encoded along with differential data.

An advantage of the present invention is that low-bandwidth serial communication signals can be used to interface with interface device 14, thus allowing a standard built-in serial interface of many computers to be used directly. Alternatively, a parallel port of host computer system 12 can be coupled to a parallel bus 24 and communicate with interface device using a parallel protocol, such as SCSI or PC Parallel Printer Bus. In a different embodiment, bus 24 can be connected directly to a data bus of host computer system 12 using, for example, a plug-in card and slot or other access of computer system 12. For example, on an IBM AT compatible computer, the interface card can be implemented as an ISA, EISA, VESA local bus, PCI, or other well-known standard interface card which plugs into the motherboard of the computer and provides input and output ports connected to the main data bus of the computer. Bus 24 can be implemented within a network such as the Internet or LAN; or, bus 24 can be a channel such as the air, etc. for wireless communication.

In another embodiment, an additional bus 25 can be included to communicate between host computer system 12 and interface device 14. Since the speed requirement for communication signals is relatively high for outputting force feedback signals, the single serial interface used with bus 24 may not provide signals to and from the interface device at a high enough rate to achieve realistic force feedback. In such an embodiment, bus 24 can be coupled to the standard serial port of host computer 12, while an additional bus 25 can be coupled to a second port of the host computer system. For example, many computer systems include a "game port" in addition to a serial RS-232 port to connect a joystick or similar game controller to the computer. The two buses 24 and 25 can be used simultaneously to provide a increased data bandwidth. For example, microprocessor 26 can send sensor signals to host computer 12 via a unidirectional bus 25 and a game port, while host computer 12 can output force feedback signals from a serial port to microprocessor 26 via a unidirectional bus 24. Other combinations of data flow configurations can be implemented in other embodiments.

Interface device 14 includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 is coupled to bus 24 and is preferably included within the housing of interface device 14 to allow quick communication with other components of the interface device. Processor 26 is considered "local" to interface device 14, where "local" herein refers to processor 26 being a separate microprocessor from any processors in host computer system 12. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 can be provided with software instructions to wait for commands or requests from computer host 16, decode the command or request, and handle/control input and output signals according to the command or request. In addition, processor 26 preferably operates independently of host computer 16 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips. In other embodiments, microprocessor 26 can include digital signal processor (DSP) capability.

Local memory 27, such as RAM and/or ROM, is preferably coupled to microprocessor 26 in interface device 14 to store instructions for microprocessor 26 and store temporary and other data. Microprocessor 26 can receive signals from sensors 28 and provide signals to actuators 30 of the interface device 14 in accordance with instructions provided by host computer 12 over bus 24. Microprocessor 26 preferably also has access to calibration parameters stored in memory 27. The calibration parameters can compensate for slight manufacturing variations in different physical properties of the components of different interface devices made from the same manufacturing process, such as physical dimensions, as is well-known to those skilled in the art.

In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). In alternate embodiments using the USB communication interface, timing data for microprocessor 26 can be retrieved from USB signal. The USB has a clock signal encoded with the data stream which can be used. Alternatively, the Isochronous (stream) mode of USB can be used to derive timing information from the standard data transfer rate. The USB also has a Sample Clock, Bus Clock, and Service Clock that also may be used.

For example, in one host-controlled embodiment that utilizes microprocessor 26, host computer 12 can provide low-level force commands over bus 24, which microprocessor 26 directly transmits to the actuators. In a different local control embodiment, host computer system 12 provides high level supervisory commands to microprocessor 26 over bus 24, and microprocessor 26 manages low level force control loops to sensors and actuators in accordance with the high level commands and independently of the host computer 18. In the local control embodiment, the microprocessor 26 can process inputted sensor signals to determine appropriate output actuator signals by following instructions that may be stored in local memory and includes calculation instructions, force magnitudes, or other data. The force process can command distinct force sensations, such as vibrations, textures, jolts, or even simulated interactions between displayed objects. These embodiments are described in greater detail in U.S. Pat. Nos. 5,739,811 and 5,734,373 both incorporated by reference herein. In an alternate embodiment, no local microprocessor 26 is included in interface system 10, and host computer 12 directly controls and processes all signals to and from the interface device 14.

Microprocessor 26 can also receive commands from any other input devices included on interface apparatus 14 and provides appropriate signals to host computer 12 to indicate that the input information has been received and any information included in the input information. For example, buttons, switches, dials, or other input controls on interface device 14 or user object 34 can provide signals to microprocessor 26.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. An embodiment of a mechanism is described with reference to FIG. 2.

Sensors 28 sense the position, motion, and/or other characteristics of a user object 34 of the interface device 14 along one or more degrees of freedom and provide signals to microprocessor 26, including information representative of those characteristics. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. Linear optical encoders, potentiometers, optical sensors, or other types of sensors can be used, and either relative or absolute sensors can be used. A suitable optical encoder is the "Softpot" from U.S. Digital of Vancouver, Wash.

Sensors 28 provide an electrical signal to an optional sensor interface 36, which can be used to convert sensor signals to signals that can be interpreted by the microprocessor 26 and/or host computer system 12. For example, sensor interface 36 can receive two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, Calif. performs the functions described above. Each sensor 28 can be provided with its own sensor interface, or one sensor interface may handle data from multiple sensors. For example, an electronic interface described in U.S. Pat. No. 5,576,727 can also be used. Alternately, microprocessor 26 can perform these interface functions without the need for a separate sensor interface 36. The position value signals can be used by microprocessor 26 and are also sent to host computer system 12 which updates the host application program and sends force control signals as appropriate. In alternate embodiments, sensor signals from sensors 28 can be provided directly to host computer system 12 as shown by bus 24', bypassing microprocessor 26. Also, sensor interface 36 can be included within host computer system 12, such as on an interface board or card. Alternatively, an analog sensors can be used instead of digital sensors. For example, a strain gauge, velocity sensors and/or accelerometers can be used to directly measure forces, velocities and accelerations on object 34. An analog to digital converter (ADC) can convert the analog signal to a digital signal that is received and interpreted by microprocessor 26 and/or host computer system 12, as is well known to those skilled in the art.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types; active actuators and passive actuators.

Active actuators include linear current control motors, stepper motors, pneumatic/hydraulic active actuators, a torquer (motor with limited angular range), a voice coil actuators, and other types of actuators that transmit a force to move an object. For example, active actuators can drive a rotational shaft about an axis in a rotary degree of freedom, or drive a linear shaft along a linear degree of freedom. Active transducers of the present invention are preferably bi-directional, meaning they can selectively transmit force along either direction of a degree of freedom. For example, DC servo motors can receive force control signals to control the direction and torque (force output) that is produced on a shaft. Passive actuators can also be used for actuators 30. Magnetic particle brakes, friction brakes, or pneumatic/hydraulic passive actuators can be used in addition to or instead of a motor to generate a damping resistance or friction in a degree of motion. In alternate embodiments, all or some of sensors 28 and actuators 30 can be included together as a sensor/actuator pair transducer.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), analog to digital controllers (ADC's), and other components, as is well known to those skilled in the art. In alternate embodiments, interface 38 circuitry can be provided within microprocessor 26, in actuators 30, or in host computer 12.

Other input devices 39 can optionally be included in interface device 14 and send input signals to microprocessor 26 or to host processor 16. Such input devices can include buttons, dials, switches, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Active actuators typically require a separate power source to be driven. Power supply 40 can be included within the housing of interface device 14, or can be provided as a separate component, for example, connected by an electrical power cord.

Alternatively, if the USB or a similar communication protocol is used, interface device 14 can draw power from the USB and thus have no need for power supply 40. This embodiment is most applicable to a device 14 having passive actuators 30, since passive actuators require little power to operate. Active actuators tend to require more power than can be drawn from USB, but this restriction can be overcome in a number of ways. One way is to configure interface 14 to appear as more than one peripheral to host computer 12; for example, each provided degree of freedom of user object 34 can be configured as a different peripheral and receive its own allocation of power. This would allow host 12 to allocate more power to interface device 14. Alternatively, power from the USB can be stored and regulated by interface device 14 and thus used when needed to drive actuators 30. For example, power can be stored over time and then immediately dissipated to provide a jolt force to the user object 34. A capacitor circuit, for example, can store the energy and dissipate the energy when enough power has been stored. Microprocessor may have to regulate the output of forces to assure that time is allowed for power to be stored. This power storage embodiment can also be used in non-USB embodiments of interface device 14 to allow a smaller power supply 40 to be used.

Safety switch 41 is preferably included in interface device 14 to provide a mechanism to allow a user to override and deactivate actuators 30, or require a user to activate actuators 30, for safety reasons. Certain types of actuators, especially active actuators such as motors, can pose a safety issue for the user if the actuators unexpectedly move user object 34 against the user with a strong force. In addition, if a failure in the control system 10 occurs, the user may desire to quickly deactivate the actuators to avoid any injury. To provide this option, safety switch 41 is coupled to actuators 30. In the preferred embodiment, the user must continually activate or close safety switch 41 during operation of interface device 14 to activate the actuators 30. If, at any time, the safety switch is deactivated (opened), power from power supply 40 is cut to actuators 30 (or the actuators are otherwise deactivated) as long as the safety switch is deactivated. For example, a preferred embodiment of safety switch is an optical switch located on user object 34 (such as a joystick) or on a convenient surface of a housing enclosing interface device 14. When the user covers the optical switch with a hand or finger, the sensor of the switch is blocked from sensing ambient light, and the switch is closed. The actuators 30 thus will function as long as the user covers the switch. Safety switch 41 can also provide a signal to host computer 12. Other types of safety switches 41 can be provided in other embodiments. For example, an electrostatic contact switch can be used to sense contact, a button or trigger can be pressed, or a different type of sensor switch can be used.

User object 34 is preferably a device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, medical instrument (laparoscope, catheter, etc.), pool cue, hand grip, knob, button, or other article. For example, medical instruments, such as laparoscopic tools or catheters, can be used to simulate medical procedures. A laparoscopic tool sensor and force feedback device is described in U.S. Pat. No. 5,623,582, incorporated herein by reference in its entirety.

Figure 2:
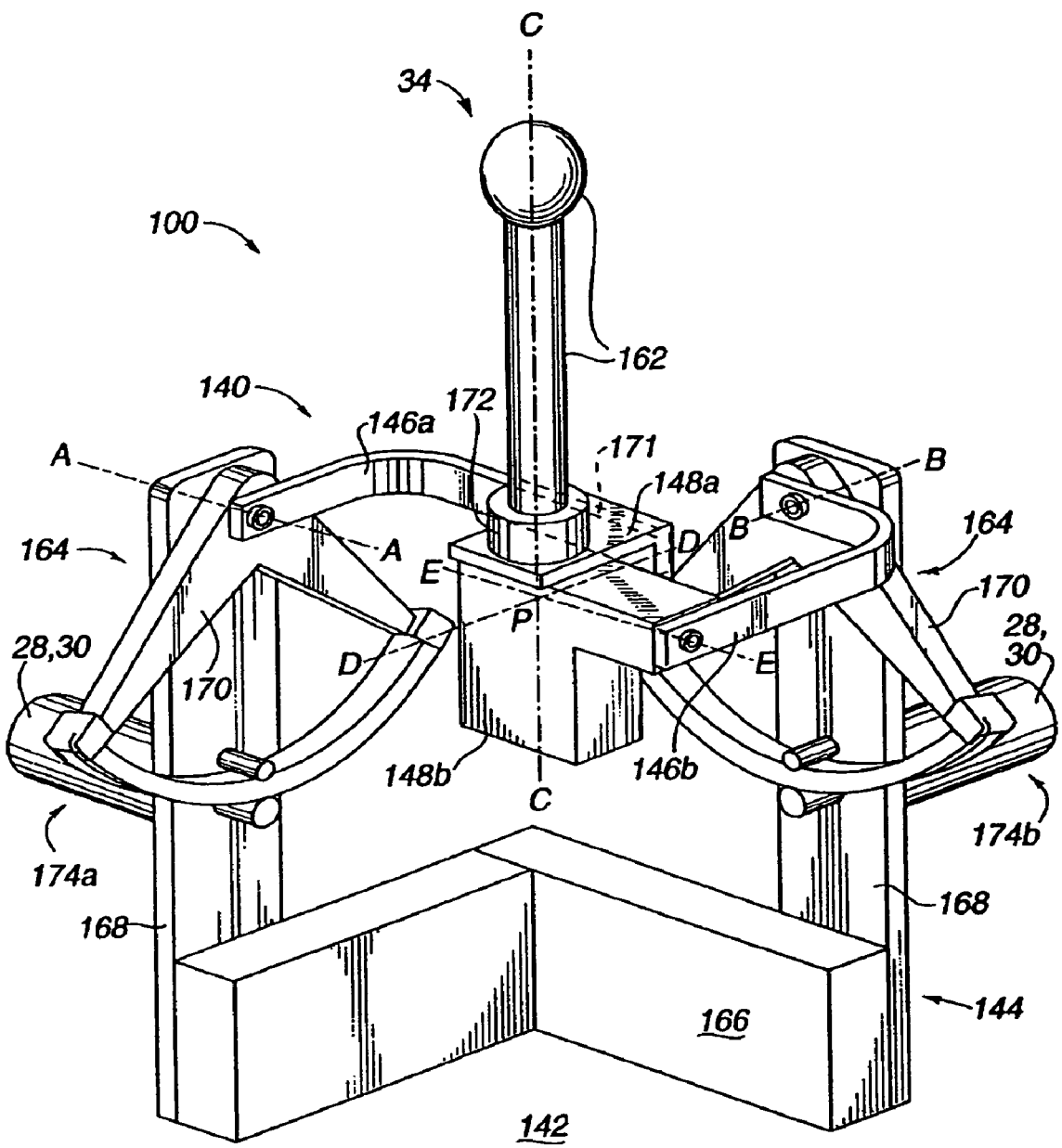
FIG. 2 is a perspective view of an embodiment of a mechanism for interfacing a user manipulatable object with the force feedback device.

FIG. 2 is a perspective view of one embodiment of a mechanical apparatus 100 suitable for providing mechanical input and output to host computer system 12. Apparatus 100 includes gimbal mechanism 140, sensors 28 and actuators 30. User object 34 is shown in this embodiment as a joystick having a grip portion 162.

Gimbal mechanism 140 provides two rotary degrees of freedom to object 34. A gimbal device as shown in FIG. 2 is described in greater detail in U.S. Pat. Nos. 5,731,804 and 5,767,839, both hereby incorporated by reference in their entirety. Gimbal mechanism 140 provides support for apparatus 160 on grounded surface 142, such as a table top or similar surface. Gimbal mechanism 140 is a five-member linkage that includes a ground member 144, extension members 146a and 146b, and central members 148a and 148b. Gimbal mechanism 140 also includes capstan drive mechanisms 164.

Ground member 144 includes a base member 166 and vertical support members 168. Base member 166 is coupled to grounded surface 142. A vertical support member 168 is coupled to each of these outer surfaces of base member 166 such that vertical members 168 are in substantially 90-degree relation with each other. Ground member 144 is coupled to a base or surface which provides stability for mechanism 140.

The members of gimbal mechanism 140 are rotatably coupled to one another through the use of bearings or pivots. Extension member 146a is rigidly coupled to a capstan drum 170 and is rotated about axis A as capstan drum 170 is rotated.

Likewise, extension member 146b is rigidly coupled to the other capstan drum 170 and can be rotated about axis B. Central drive member 148a is rotatably coupled to extension member 146a and can rotate about floating axis D, and central link member 148b is rotatably coupled to an end of extension member 146b at a center point P and can rotate about floating axis E. Central drive member 148a and central link member 148b are rotatably coupled to each other at the center of rotation of the gimbal mechanism, which is the point of intersection P of axes A and B. Bearing 172 connects the two central members 148a and 148b together at the intersection point P. The axes D and E are "floating" in the sense that they are not fixed in one position as are axes A and B. Axes A and B are substantially mutually perpendicular.

Gimbal mechanism 140 is formed as a five member closed chain such that each end of one member is coupled to the end of a another member. Gimbal mechanism 140 provides two degrees of freedom to an object 34 positioned at or near to the center point P of rotation. An object at or coupled to point P can be rotated about axis A and B or have a combination of rotational movement about these axes. In alternate embodiments, object 34 can also be rotated or translated in other degrees of freedom, such as a linear degree of freedom along axis C or a rotary degree of freedom about axis C.

A capstan drive mechanism 164 is preferably coupled to each vertical member 168. Capstan drive mechanisms 164 are included in gimbal mechanism 140 to provide mechanical advantage without introducing friction and backlash to the system. The capstan drive mechanisms 164 are described in greater detail in U.S. Pat. No. 5,767,839.

Sensors 28 and actuators 30 can be coupled to gimbal mechanism 140 at the link points between members of the apparatus. Sensors 28 and actuators 30 can be combined in the same housing of a grounded transducer 174a or 174b, as shown. For example, optical encoder sensors 28 and active DC servo motors 30 can be combined in transducer 174. The housing of grounded transducers 174a and 174b are preferably coupled to a vertical support member 168. A rotational shaft of actuator and sensor is coupled to a pulley of capstan drive mechanism 164 to transmit input and output along the associated degree of freedom. The transducers 174a and 174b of the described embodiment are advantageously positioned to provide a very low amount of inertia to the user handling object 34, as explained in U.S. Pat. No. 5,731,804.

User object 34 is shown as a joystick having a grip portion 162 for the user to grasp. A user can move the joystick about axes A and B. The movements in these two degrees of freedom are sensed by processor 26 and host computer system 12. Forces can be applied preferably in the two degrees of freedom to simulate various haptic sensations. Joystick may also optionally "spin" about axis C, and this movement may be sensed and/or actuated. Optionally, other objects 34 can be coupled to gimbal mechanism 140, as described above.

Other embodiments of interface apparatuses and transducers can also be used in interface device 14 to provide mechanical input/output for user object 34. For example, interface apparatuses which provide one to three (or more) linear degrees of freedom to user object 34 can be used. In addition, passive actuators having an amount of "play" can be provided to implement different reflex processes. Other embodiments of actuators and interfaces are described in U.S. Pat. Nos. 6,024,576, 5,767,839, 5,721,566, and 5,805,140, all hereby incorporated by reference herein.

Impulse-Shaped Force Signals

In accordance with an embodiment of the present invention, there is provided a technique for generating impulse-shaped force signals that advantageously preserves the fidelity of the apparent sensation upon the user while maximizing the dynamic range of the actuators of the force feedback device. The inventive impulse-shaped force signals can be employed to generate "condition"-related sensations or, more preferably, to generate "effect"-related sensations.

To further elaborate, effects are different from conditions. Conditions may be conceptualized as background sensations, the intensity or quality of which depends upon the motion (e.g., displacement, velocity, acceleration, direction, and the like) of the user manipulable portion (e.g., the user object 34) of the force feedback device. Accordingly, conditions may be thought of as closed-loop sensations, and require inputs from the sensors that monitor the motion of the user manipulatable portion of the force feedback device to properly form the force signals therefor.

Figure 3A:
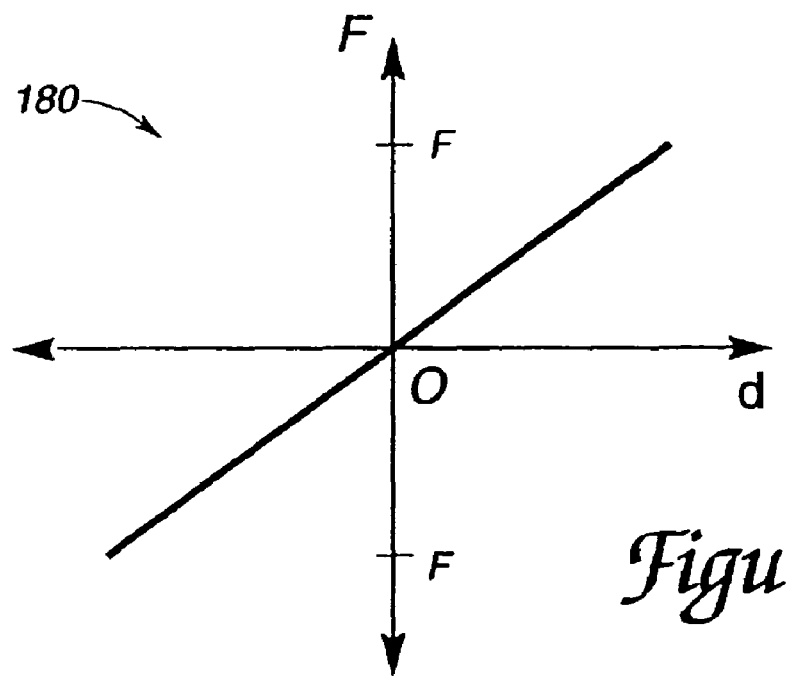
FIGS. 3a and 3b are diagrammatic representations of example restoring force conditions.

For example, conditions may define basic physical properties of an interface device such as the underlying feel of the motion of the user object. Conditions can be applied to make the user object feel "loose", "stiff", "heavy", "light", "sticky", "scratchy", "slippery", etc. Different conditions can be provided for a variety of different situations, such as simulating the feel of different types of vehicles, simulating the feel of damaged vehicles, One example of a condition is a stiffness property. FIG. 3a is a graph 180 illustrating force versus displacement profiles for a stiffness condition. Stiffness can be described as a "spring return", since it feels to the user as if a strong spring resists displacement of the user object. The stiffness provides a constant return sensation that forces the user object back to an origin or neutral position, where the force increases the further the object is moved from the origin (an origin can be the center position of a joystick as shown in FIG. 2). In the described example, the stiffness is generally modeled using Hooke's Law, where resistance force F is proportional to the displacement d, such that:

$F = k*d$ where d is the displacement along an axis and k is a spring constant defining the degree of stiffness. K can also be positive or negative to indicate the degree of stiffness in a particular direction on an axis or degree of freedom. For example, +k can be different than −k such that it is much harder to push a joystick forward than to pull it back; this sensation might be used to simulate the feel of a tug boat pushing a heavy load. The force in graph 180 of FIG. 3a is bi-directional, where the force for positive displacements (+d) is applied in one direction along a degree of freedom of user object 34, and the force for negative displacements is applied in the opposite direction along that degree of freedom. Alternatively, force might only be applied in one direction on an axis or degree of freedom.

Figure 3B:
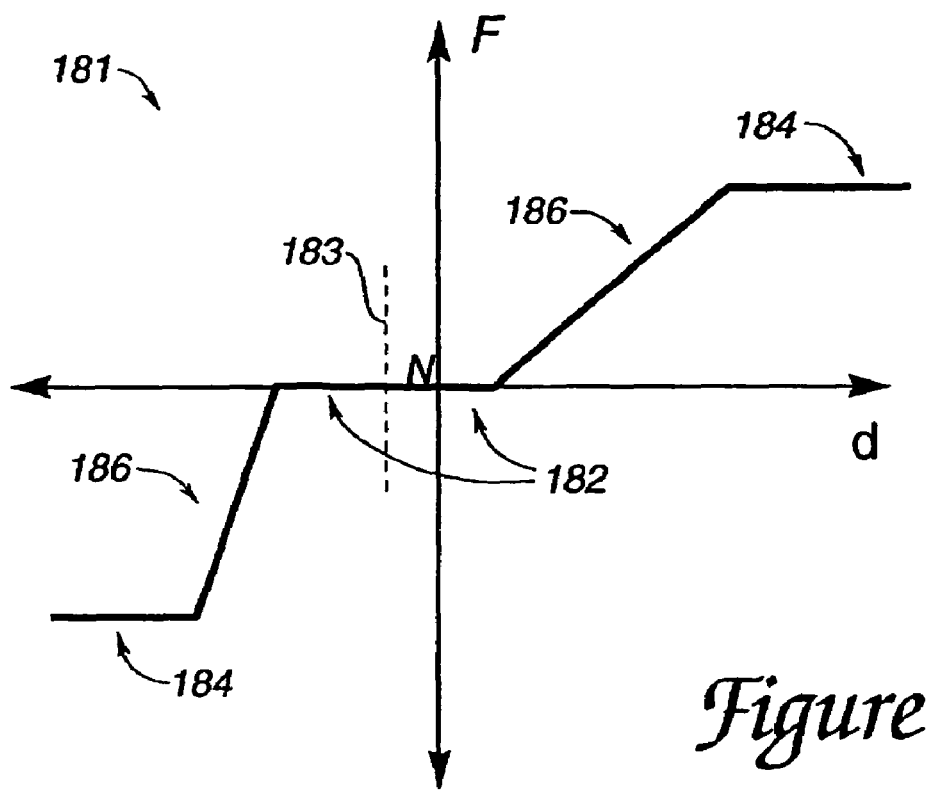

In FIG. 3b, graph 181 shows the stiffness condition similarly to FIG. 3a, except that the applied force is about zero in a region 182, about a neutral position. Region 182 is known as a "deadband" and allows the user to have some freedom to move object 34 for a short distance around the neutral position before forces are applied. The deadband can be selectively applied in positive and/or negative directions in each degree of freedom. In addition, an offset 183 of the neutral position along an axis can be specified.

FIG. 3b also shows saturation regions 184, where the magnitude of stiffness generally remains constant. Positive and/or negative saturation regions can be defined for each degree of freedom. The saturation force magnitude F is can be limited to a predetermined percentage of the maximum possible output force in a the selected degree of freedom, so that effects can be overlaid on top of the restoring sensation (or, the impulse shaping described below can perform this limiting function). As the object 34 is moved in the saturation range, the applied force F is constant until the user object is moved within a spring region 186, where the applied force falls in accordance with distance to the neutral position until the deadband region 182 is reached.

A stiffness sensation can be very ably applied, for example, to the situation of hitting a wall or some other obstruction while controlling a simulated vehicle. The restoring force indicates a resistance against commanding a velocity in a direction of motion. This force drops off when the user object is returned to the origin position because the user is no longer commanding a velocity in the direction of motion.

Another condition is a damping property. The damping condition creates a "viscous" force on user object 34 having a magnitude proportional to the velocity, rather than the displacement, of the user object when moved by the user. Similar relationships to those in FIGS. 3a and 3b can be used, where the displacement axis is replaced by a velocity axis, and the spring constant k is replaced by a damping coefficient b. Damping can be used to simulate controlling, for example, a very heavy vehicle that is poorly responsive to the movement of the user object. This and other conditions are described in greater detail in U.S. Pat. No. 5,734,373.

In contrast, effects (also known as "overlays") are sensations which are generated and applied to the user independent of the motion of the user manipulable portion of the force feedback device. In other words, effects are open-loop sensations and are generated by the actuators of the force feedback device as a function of time irrespective of the current motion of the user object 34. One may think of effects as foreground force overlays, which may be superimposed on whatever background condition-force(s) are currently generated by the force feedback device. Effects are often correlated with discrete events that may occur during a simulation or game.

Effects may be of short duration, such as a jolt occurring from a missile impact on a plane, or may be longer in duration, such as a bobbing sensation of a boat caught in a wake of a large tanker.

Figure 4A:
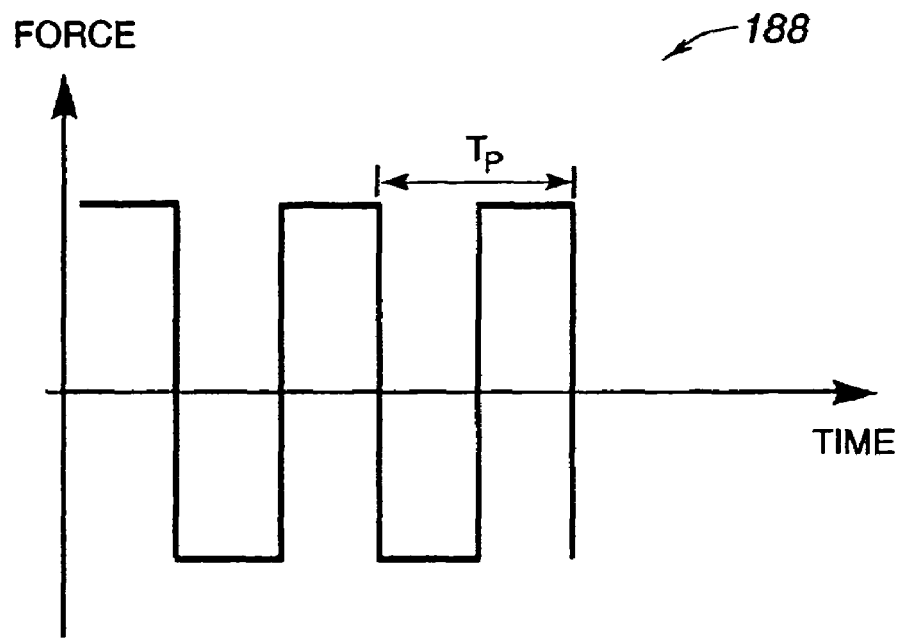
FIGS. 4a and 4b are diagrammatic representations of example vibration force effects.
Figure 4B:
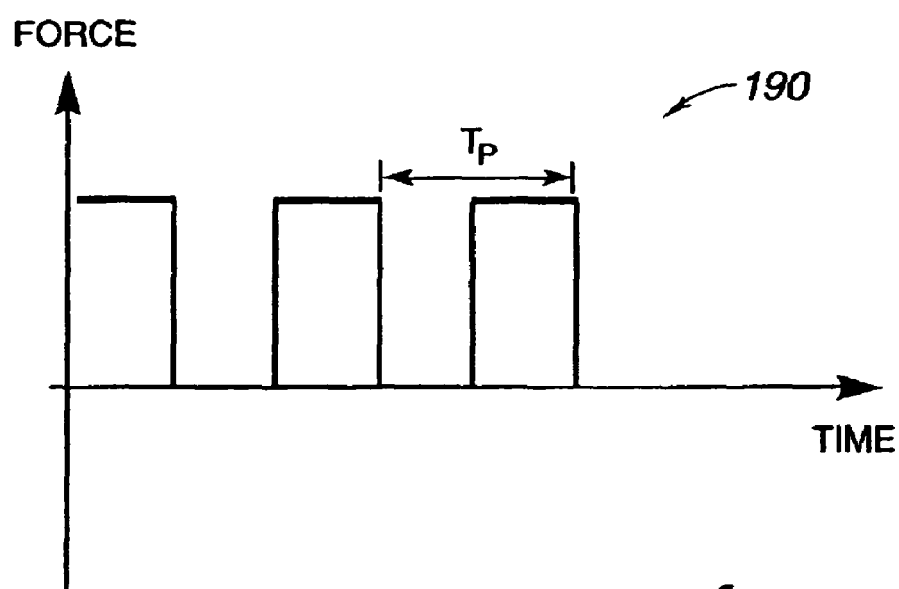

One example of an effect is a vibration force. FIGS. 4a and 4b are graphs illustrating force versus displacement graphs for a vibration effect. FIG. 4a is a graph 188 showing a bi-directional vibration force while FIG. 4b is a graph 190 showing a uni-directional vibration force. The vibration has a magnitude indicated by the vertical axis and a frequency and includes a number of force pulses separated by zero or negative force pulses, which provides the user a rapid "on-off" sequence of forces. The vibration force can be specified as a sinusoidal force, a sawtooth-shaped force, a square waveform force, etc. The duty cycle and other parameters of the vibration can also be specified.

Other effects include a wobble force and a jolt force. A wobble force creates a random (or seemingly random to the user), off-balance force sensation on the user object. For example, it can simulate an erratic control for a damaged vehicle. The jolt force is typically a single short, high magnitude force that is output on the user object, and can be used, for example, to notify the user of an event or simulated object in the computer environment.

Both conditions and effects can be provided simultaneously to the user object 34. In a car simulation, for example, conditions may be generated to give the user the physical feel of manipulating a virtual steering wheel based on what kind of car the user is driving, the speed of travel, road surface characteristics (dry, wet, ice, etc.), and the like. The condition force signal is a function of steering wheel manipulation. An effect may be generated to give the user the feel of an event external to steering wheel manipulations, such as hitting a pothole or getting sideswiped by another car. To generate this effect, the processor only needs to define the force signal representing the sensation of hitting the pothole as a function of time.

Figure 5:
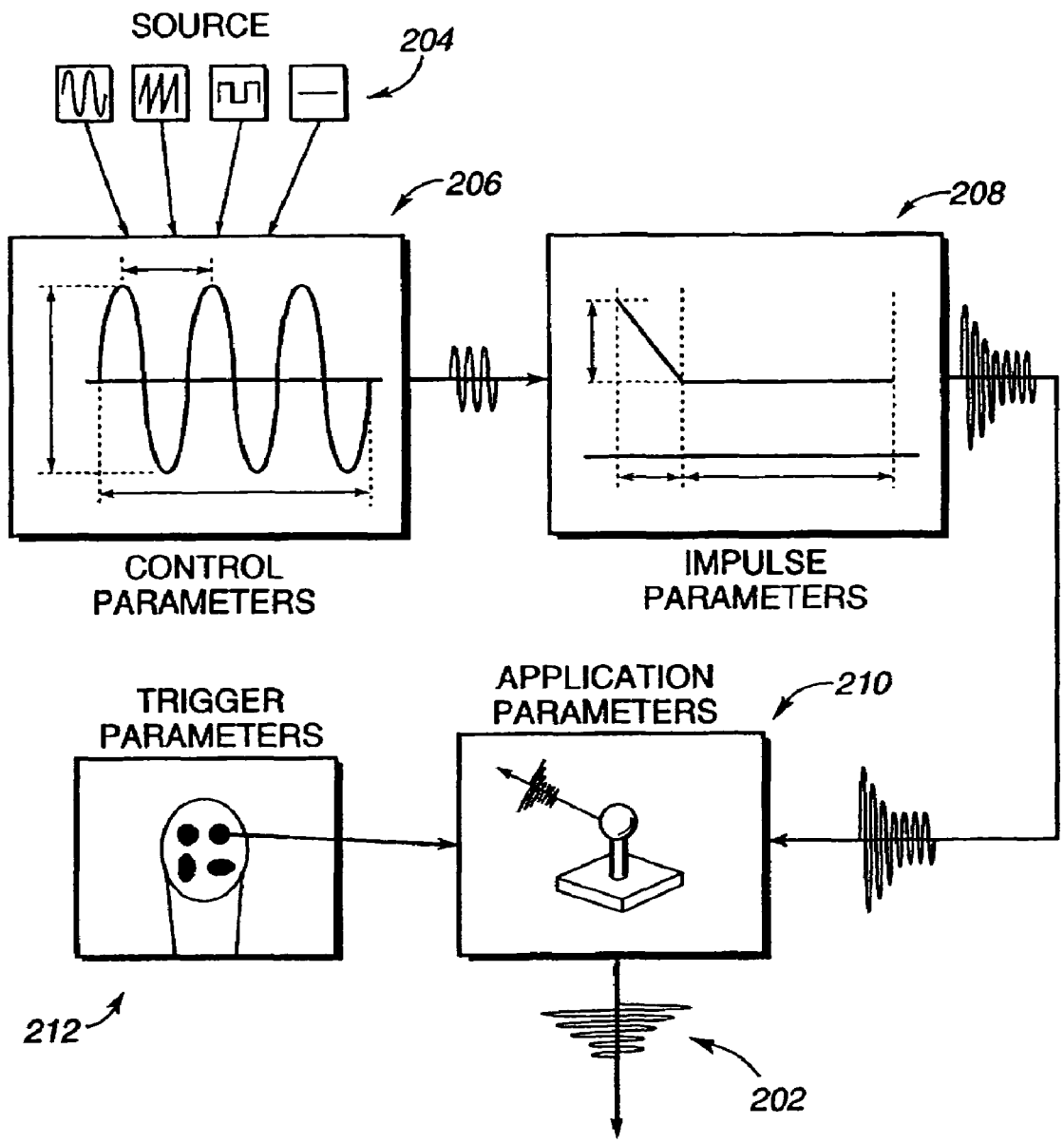
FIG. 5 is a diagrammatic representation of a force signal shaping method of the present invention.

FIG. 5 describes one embodiment of the present invention, in which a basic source signal or "source wave" is "shaped" to alter the source wave to an impulse-shaped force signal that advantageously preserves the fidelity of the apparent sensation upon the user while maximizing the dynamic range of the actuators of the force feedback device.

In accordance with one aspect of the present invention, it is realized that diverse feel effects can be created by generating time-varying force signals upon the force feedback device. It is also realized that humans are more sensitive to certain haptic features of a force signal and less sensitive to other features. Accordingly, if a force signal can be defined by variables that have a substantial impart upon the human perception of the resulting feel sensation and without including variables having a less significant impact, a simple and generalized representation of force signals may be achieved. Via the simplified, generalized representation of force signals, the task of modeling and generating the desired feel sensation may be simplified and made more efficient for the programmer, the processor, and the actuators of the force feedback device.

It has been found that human physical, i.e., haptic, senses are most sensitive to changes in force intensity, e.g., transients or impulses, and are substantially less sensitive to constant forces or slowly changing forces. Accordingly, forces may be most efficiently conveyed to the user by an exaggerated transient or "impulse" having a relatively high magnitude, which decays over a settle time to a "steady-state" magnitude value that is sufficient to convince the user of the continuing presence of the effect.

In one embodiment of the present invention, the generalized representation of force signals is an impulse-shaped force signal, i.e., a source wave that has been "shaped" to include an impulse. The shaped signal advantageously captures primary perceptual features of a force signal to substantially preserve the fidelity of the apparent sensation upon the user when it is translated into forces by actuators of the force feedback device. Impulse-shaped force signals are efficient in conveying the desired feel sensation to the user since humans are most sensitive to force transients, not steady states.

Further, since human haptic senses are significantly less sensitive to the magnitude of the steady state force, it is discovered that the magnitude of the steady state signal which follows the impulse need not be as high as the magnitude of an analogous non-impulse signal that is required to create the same sensation upon the user. As will be discussed in detail herein, this aspect of the inventive impulse-shaped force signal provides many advantages.

Referring to FIG. 5, an impulse-shaped time varying force signal 202 of the present invention is represented by a source wave 204, a set of control parameters added by a control parameter step 206, and a set of impulse parameters added by an impulse shaping step 208, a set of application parameters added by an application parameter step 210, and a set of trigger parameters added by a trigger parameter step 212.

A source wave 202 is initially provided. The source wave defines the basic signal from which the effect is created. The source wave may be any predefined type of wave or signal, which may be as simple as a constant force value, or as complex as a square wave, sinusoidal wave, sawtooth wave, triangular wave, or any other arbitrary signal. In some embodiments, the source wave can be a "force profile", which is a series of predefined digital force values that can be stored in a storage device.

The control parameter step 206 adds a number of control parameters to the source wave to define the wave. Control parameters regulate the feel of the force. For example, some or all of the following can be included as control parameters: the frequency of the signal, its duration, its steady-state magnitude, and its offset (i.e., DC voltage component). If the source wave is a constant force signal, frequency control parameters do not apply.

The impulse shaping step 208 modifies or shapes the signal to a desired "quality" to determine how the initial impulse force and the following steady state force will feel. Preferably, a set of impulse parameters is added to the signal to characterize this shaping. The set of impulse parameters includes the impulse magnitude, the settle time (i.e., the time required for the force signal to settle to its steady-state magnitude from the impulse magnitude), and the steady-state time. The steady time represents the difference between the duration (furnished as a control parameter) and the settle time (furnished as an impulse parameter) and may not be required in some cases.

To illustrate the impulse shaping aspect of the present invention, consider the following example. Suppose the programmer wants to create the feel of a virtual car hitting the side railing of a race track while making a wide turn. Perceptually, this effect may be conveyed to the user by a sharp impulse when the user's car hits the railing. The magnitude of the impulse may be larger than the magnitude of the specified impact. This impulse is allowed to settle down to a steady state value, preferably over a short duration in this example to accentuate the intensity of the collision. The reduced steady state signal, once reached, presents a subtle resistive force that is sufficient to convincingly maintain the physical illusion that the railing is a solid entity that resists penetration. The steady state signal may be allowed to continue for a period of time, or indefinitely until the driver recovers the turn and pulls the car away from the railing in this case. In the present invention, the reduced steady-state signal preferably has a magnitude that is significantly lower than the magnitude of prior art force signals required to create the same apparent sensation upon the user.

FIG. 6 illustrates the impulse-shaped force signal for an exemplary effect. In FIG. 6, the source wave 204 is a sinusoidal wave. In step 206, control parameters are added, which include a steady-state magnitude of 25% (e.g., 25% of the maximum force level that can be generated by the actuator), a frequency of 100 Hz, and a duration of 50 milliseconds (mS). In step 208, impulse parameters are added which include an impulse level of 50% and a settle time of 25 mS. After the impulse, the force signal settles, and a steady state force at 25% force level persists until terminated, i.e., when the duration expires after an additional 25 mS. Note that although the decay is shown in FIG. 6 to be a linear decay from the impulse peak, it is contemplated that other types of decay, e.g., logarithmic, may be specified via a parameter if desired. It should be noted that, in general, the settle time is much shorter than the steady state duration; for example, the settle time can be 1/10 the steady state time, or shorter.

In some cases, it may be desired to provide an impulse level that is lower than the steady state level (thus, the force output would increase during the settle time to the steady state level after the impulse level). Also, in some embodiments, a "fade time" can be included as an impulse parameter. The fade time period occurs after the steady state time period and defines a period when the force level decays from the steady-state level to approximately a zero level. This may be used to provide a "fade out" of forces. As with the decay during the settle time, the fade time decay can be provided as a linear, logarithmic, or other type of decay.

As mentioned earlier, the use of the inventive impulse-shape force signal for creating feel sensations is advantageous since its simplified and generalized representation simplifies the task of specifying and creating the desired feel signal to convey a particular feel effect to the user. Via the inventive impulse-shaped force signal forming technique, steady state signals of relative low magnitudes may be employed to convincingly impress upon the user of the continued presence of an effect. Accordingly, less power is consumed by the actuators of the force feedback device, thereby allowing alternative sources of power such as the USB to be used in some embodiments. In addition, reduced power requirements may allow smaller actuators to be used in the force feedback interface device, which is desirable for the consumer mass market. Finally, less heat is generated by the actuators when using less power, which lessens the potentiality of heat-related damage to the components of the force feedback device.

More importantly, the use of the inventive impulse-shaped force signal forming technique advantageously maximizes the available dynamic range of the actuators. To elaborate, most actuators have a finite maximum force level that can be applied. This force level may be limited by the actuators themselves or by the power electronics that drive the actuators. If multiple force effects are present, the cumulative force of these effects can exceed the maximum force level that can be applied by an actuator if the effects are simply superimposed on one another, as was done in the prior art. By conveying a feel sensation as a strong impact followed by a subdued steady state force level, a low background force level may be maintained while convincingly convey to the user of the continued presence of the effect. A subsequent effect may then be superimposed on this subdued steady state level without exceeding the dynamic range limitations of the hardware.

The above advantages may be better understood with reference to the following example. In a flight simulator game, for example, the virtual airplane may be hit by a strong cross-wind (the first effect) from the right. If the intense sensation of the cross-wind is conveyed in a conventional manner to the pilot as a strong constant force pushing to the left on the joystick, there may be little dynamic range left in the actuator to convey other subsequent effects, e.g., being impacted by enemy bullets from the right.

If these effects are created via the inventive impulse-shaped force signals, the cross-wind would be conveyed to the user by a sharp impulse to the left, followed by a subdued steady state force on the joystick that pushes to the left. Because the human pilot is most sensitive to the transient and not the magnitude of the steady state force, the resulting sensation from this effect is still convincing as an intense cross-wind. However, since the sensation is continually conveyed during the steady state period as a lower level constant force, there is more dynamic range left in the actuator to convey a subsequent effect, e.g., being impacted by bullets from the right.

The inventive impulse-shaped force signal forming technique may also employ other optional parameters to convey other aspects of a feel sensation. Referring to FIG. 5, an optional application parameter step 210 may be included to add application parameters describing how the shaped signal is applied to the force feedback interface device. The application parameters indicate the vector or directions of the applied force signal. For example, an axis parameter is an application parameter that may be employed to indicate which axis (e.g., x, y, and z, or specific axes of rotation/translation) of the force feedback device to apply the force signal. A 2D angle parameter may be specified to indicate the direction of effect application for a 2D device. A 3D angle parameter may likewise be specified to indicate the direction of effect application for a 3D device.

Optional trigger parameter step 212 relates to trigger behavior and provides trigger parameters to the impulse-shaped signal. Trigger parameters may be employed to indicate, for example, when a defined effect should be executed. A button trigger parameter, for example, indicates which switch(es) or button(s) of the force feedback device should trigger the impulse-shaped effect when pressed. Button trigger parameters are useful in creating reflex-type effects, which are automatically executed whenever a switch or button on the force feedback device is activated. Reflex-type effects do not require continual intervention by the host processor, thereby alleviating the communication and computational burden on the part of the host. Reflex-type effects are most useful for effects that occur frequently, e.g., the "gun recoil" sensation for automatic weapons. Another trigger parameter is the repeat delay parameter, which may be employed to specify the delay time, typically in milliseconds, between multiple executions of an effect, e.g., for auto-repeat or "autofire" sensations. Such reflex trigger forces are described in greater detail in U.S. Pat. No. 5,691,898, hereby incorporated by reference herein in its entirety.

In accordance with an advantageous aspect of the present invention, multiple simple effects can be sequenced to create a more complex effect. The complex effect may be represented by sequencing the impulse-shaped force signals associated with the constituent simple effects. For example, a game programmer may wish to convey a special weapon (SW) firing effect, which is characterized by a sharp recoil upon firing followed by a softer side-to-side vibration. This combination may be represented by a single sequenced effect with a recoil component, followed by a side-to-side vibration component. These constituent components may be represented by an individual impulse-shaped force signal, which is then sequenced to represent the sequenced effect. The exemplar firing effect may be represented as follows.

Recoil Effect
Source:=[Constant Force]
Control Parameters:=[Magnitude=65%, Duration=100 milliseconds]
Impulse Parameters:=[Impulse Level=95%, Settle Time=20 milliseconds]
Application Parameters:=[Y_Axis]
Vibrate_Effect
Source:=[Square Wave]
Control Parameters:=[Magnitude=25%, Frequency=50 Hz, Duration 150 milliseconds]

Impulse Parameters:=[Impulse Level=50%, Settle Time=50 milliseconds]
Application Parameters:=[X_Axis]
Firing_Effect
Source:=[Recoil Effect, Vibrate_Effect]
Control Parameters:=[Magnitude=75%]
Trigger Parameters:=[Button_Mask=1, Repeat_Delay=100 milliseconds]

Figure 7A:
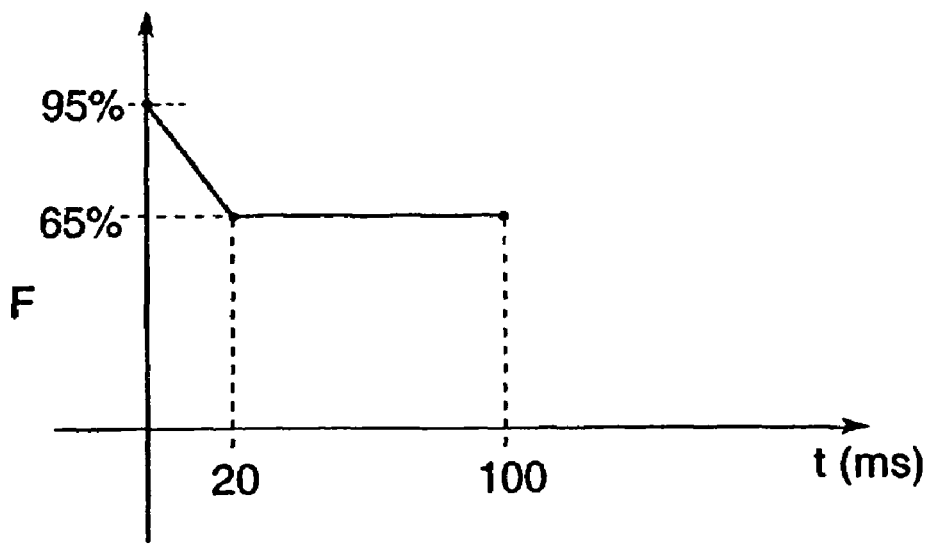
FIG. 7a is a diagrammatic representation of the shaping of a recoil effect.

The recoil effect component is characterized by an impulse at 95% of maximum force level, which is then allowed to decay to 65% force level in 20 milliseconds. Thereafter, there is 80 milliseconds of steady-state constant force at 65% force level. As indicated by the application parameter, this force signal is applied along the Y-axis of the force feedback device. FIG. 7A illustrates the force signal that results from the above representation of the recoil effect.

Figure 7B:
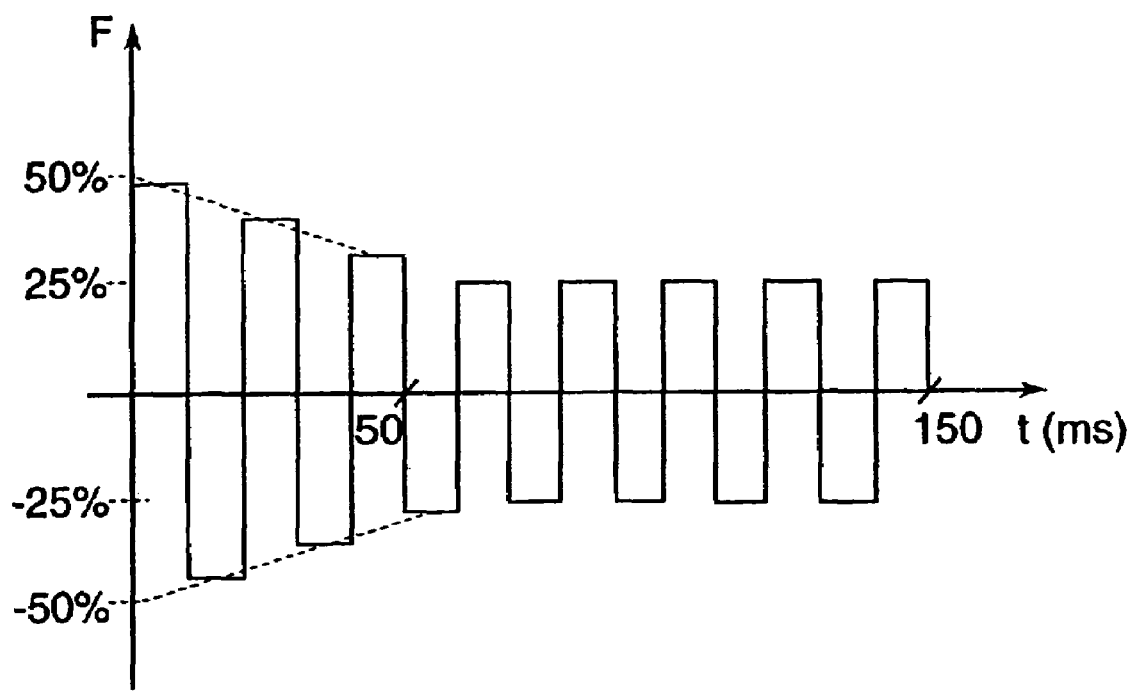
FIG. 7b is a diagrammatic representation of the shaping of a vibration effect.

The vibrate effect is characterized by a square wave of 50 Hz frequency. The square wave is applied as an impulse at 50% force level and allowed to decay to 25% force level in 50 milliseconds. Thereafter, there is 100 milliseconds of steady-state constant force at 65% force level. As indicated by the application parameter, this vibration force signal is applied along the X-axis of the force feedback device. FIG. 7B illustrates the force signal that results from the above representation of the vibrate effect.

Figure 7C:
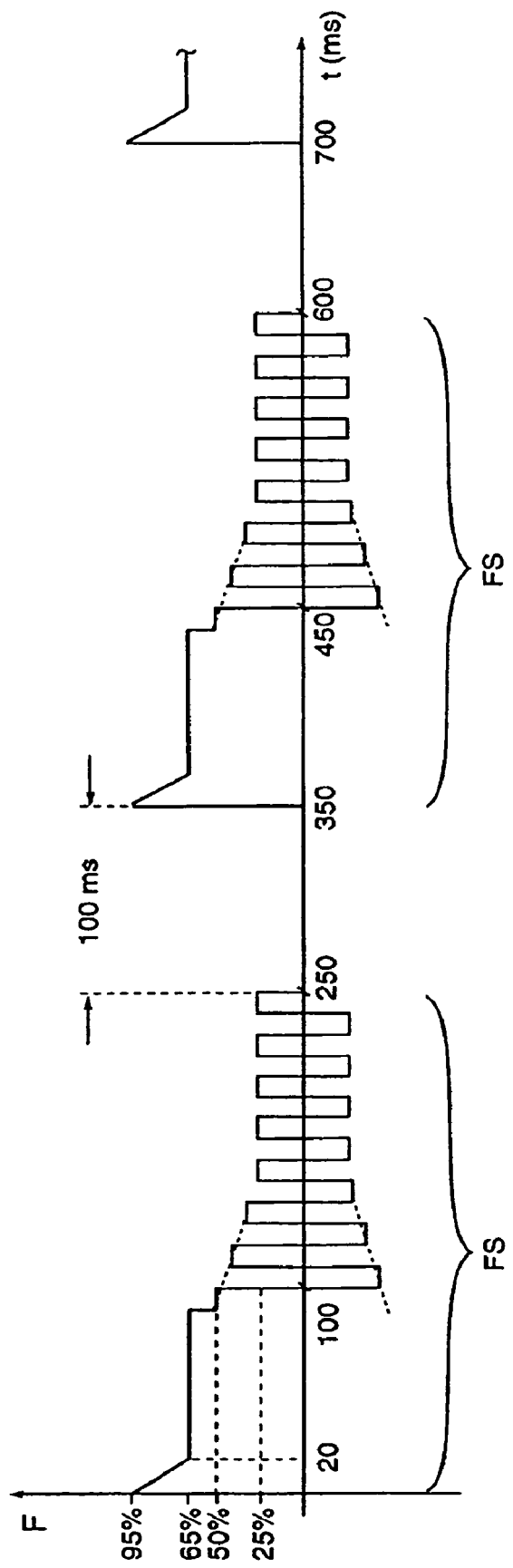
FIG. 7c is a diagrammatic representation of the sequencing of the recoil and vibration effects of FIGS. 7a and 7b.

The sequenced firing effect is a combination of the recoil effect followed by the vibrate effect. Impulse-shaped force signal FS of FIG. 7C represents the sequenced effect that is conveyed to the user each time the weapon is fired. Multiple force signals FS are shown in FIG. 7C to illustrate the effects that result when button #1 of the force feedback device is held down continuously. As indicated by the trigger parameters above, the auto-repeat (or "autofire") effect is characterized by a 100 millisecond delay between consecutive sequence effects. Although not shown in FIG. 7C, the recoil portion of each force signal FS is applied along the Y-axis, and the vibrate effect is applied along the X-axis.

Figure 8:
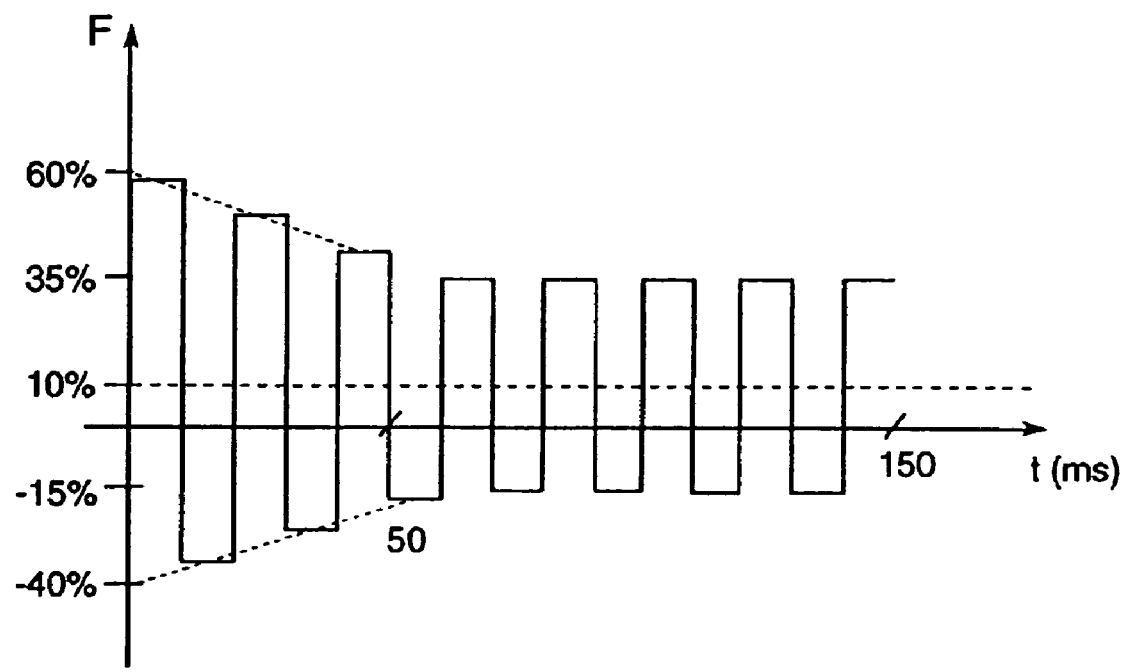
FIG. 8 is a diagrammatic representation of an impulse-shaped force signal having an offset.
Figure 9:
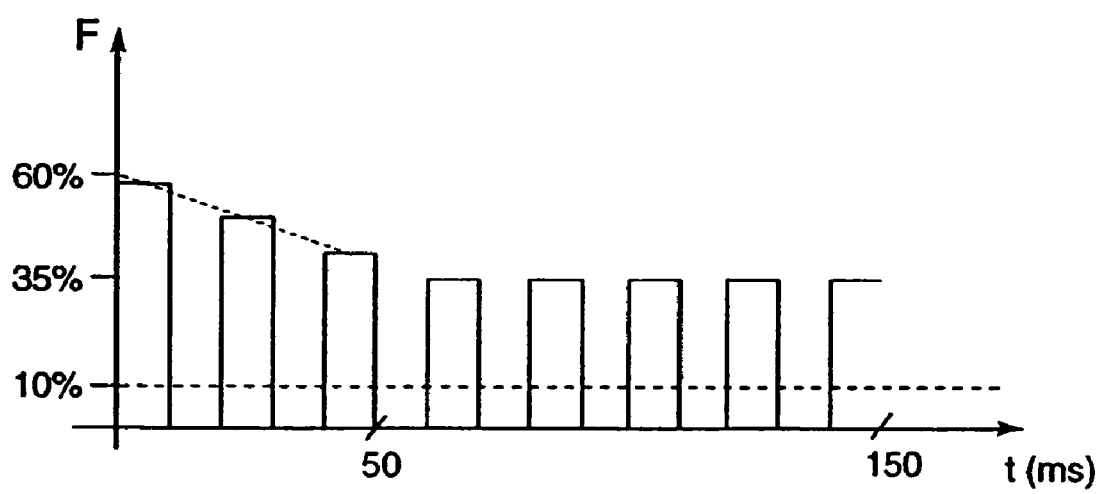
FIG. 9 is a diagrammatic representation of an impulse-shaped force signal having an offset and being constrained to positive values.

As mentioned earlier, an offset is a control parameter which may be specified to regulate the "feel" of the source wave. The offset parameter, when present, indicates the amount by which a force signal is offset from the zero-force level, i.e., the offset represents a DC component. By way of example, FIG. 8 shows an impulse-shaped force signal characterized by an offset of 10%. In addition, a directional parameter may further constrain the force signal to have only positive values, only negative values, or both. FIG. 8 is an example where the directional parameter indicates that the impulse-shaped force signal may have both positive and negative values. FIG. 9 illustrates the impulse-shaped force signal of FIG. 8 but with the directional parameter constraining values to be only positive.

Figure 10:
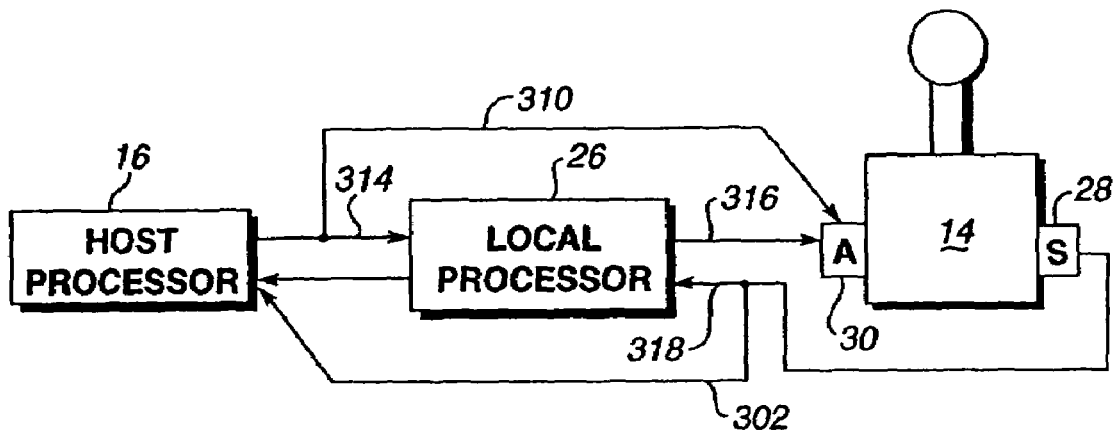
FIG. 10 is a block diagram of a force feedback device system suitable to implement the impulse-shaped force signals of the present invention.

FIG. 10 illustrates a schematic of force feedback device system 10, including a host processor 16 and local processor 26, to facilitate discussion of the labor-division aspect of the present invention in terms of the conditions and effects described herein. In the various embodiments of this aspect, the computational burden associated with forming force signals for conditions and effects is divided between the local processor and the host processor as needed to optimize performance.

In accordance with one embodiment, the host processor 16 is employed to form the force signals that represent conditions, i.e., the closed-loop feel sensations for which the force applied to the user is a function of the state of the force feedback device. With reference to FIG. 10, for example, the host processor 16 may receive via path 302 the sensor outputs from a sensor 28 of force feedback device 14. Using the received sensor data, host processor 16 then creates the desired conditions, e.g., stiffness, damping, friction, inertia, or the like. The time-varying values of the formulated force signals may then be transmitted to the actuator 30, via path 310 in FIG. 10 for example, thereby causing actuator 30 to impart the desired feel sensation upon the user.

Alternatively, the local processor 26 may receive the time-varying values representative of the formulated force signals from the host machine, e.g., via path 314, and relay these time-varying values to the actuator of the force feedback device 14 via path 316. If desired, local processor 26 may perform additional processing, e.g., filtering or smoothing, on the received condition-related time-varying values prior to passing them on to actuator 30.

In another embodiment of the present invention, the local processor 26 is preferably employed to generate the force signals that create the condition-related sensations. It is preferable to employ the local processor for the task of forming condition-related force signals since the local processor is typically capable of communicating with the force feedback device sensors and actuators at a faster rate than the host processor. For example, a local bus 318 may enable local processor 312 to read sensor 28 thousands of times per second, a rate which is difficult to achieve using conventional host processor communication ports, e.g., a RS-232_serial port or even USB. Once the force signals are formulated by local processor 312, their time-varying values may be transmitted directly to actuator 30 to create the desired feel sensation upon the user. In this embodiment, the host processor may command parameters such as stiffness (K) or damping (B) to the local processor which then uses that parameter to generate the appropriate condition. Independent parameters can be specified for each axis or degree of freedom and for each direction on an axis or degree of freedom. This passage of parameters allows synchronization of host events with feel conditions.

Further, the task of formulating condition-related force signals is computationally intensive. The need to continually read sensors of the force feedback device and adjust the force signals applied to the actuators of the force feedback device may impose an unacceptably high computational burden on the host processor. In some cases, the host processor may be rendered incapable of properly executing the simulation program. By off-loading the task of forming condition-related force signals to the local processor, the computational bandwidth of the host processor is advantageously improved, thereby enabling the host processor to better attend to tasks requiring its attention, e.g., running the simulation program.

The use of the local processor for formulating condition-related force signals is particularly appropriate if the sensor values required to calculate the condition-related force signals are not needed at the host machine, or are not needed at a fast rate at the host machine. By formulating the condition-related force signals locally at the local processor, these sensor values need not be continually updated to the host processor, thereby freeing up the bandwidth in the communication channel to and/or from the host processor, e.g., channel 302 in FIG. 10.

In accordance with another aspect of the present invention, the effect-related force signals are generated at the host processor and transmitted, via channel 310 for example, to the actuators of the force feedback device. As mentioned earlier, effects are different from conditions in that effects are essentially open-loop sensations and may be formed without taking into account the motion of the force feedback device. Alternatively (or in addition), the effect-related force signals may be generated locally on the local processor and transmitted directly, via channel 316 for example, to the actuators of the force feedback device. The use of the local processor to locally generate effect-related force signals is particularly advantageous when the effect is executed frequently, e.g., the aforementioned "gun recoil" effect. For example, the local processor can run a button check loop as a background process. When the local processor determines that the user has pressed a button from sensor data, a jolt effect force can be overlaid on any existing forces that are output. Or, when the host processor commands that a particular effect be output, the local processor receives this command and outputs the force effect, either by calculating the force effect anew or by outputting a digitally stored force profile. Note that if both condition-related force signals and effect-related force signals are formulated locally at the local processor, the computational bandwidth, as well as communication bandwidth, associated with the host processor may be significantly improved as these tasks are off-loaded from the host processor to the local processor.

In accordance with yet another aspect of the present invention, the stream of digital data representing time-varying values of a force signal may be transmitted to the local processor from the host processor or to the actuators of the force feedback device as a series of overlapping data packets. Overlapping data packets are consecutive packets of digital data which contain at least one same digital value or the same group of digital values. When the same digital data value or the same group of digital values are contained in more than one data packet, the integrity of the transmitted data is not compromised even when one of the consecutive data packets is rendered unusable, e.g., garbled or lost, as a result of the transmission.

Figure 11A:
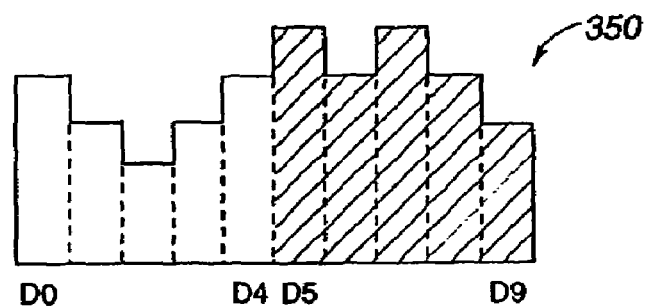
FIGS. 11a and 11b are diagrammatic representations of data packets of the present invention having overlapped data values.
Figure 11B:
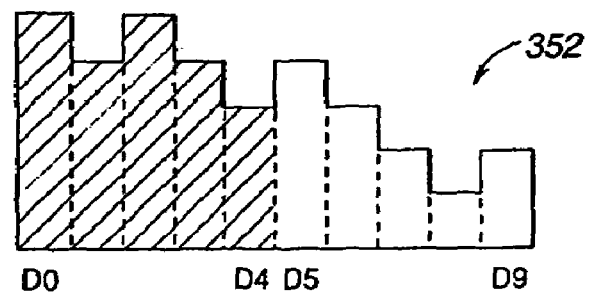

FIG. 11(*a*) illustrates an exemplar data packet 350 which contains 10 digital force signal values (D0–D9). Another data packet 352 in FIG. 11(*b*) also contains 10 digital force signal values (D0–D9). However, data packets 350 and 352 contain the same group of five digital values (i.e., D5–D9 in FIG. 11(*a*) and D0–D4 in FIG. 11(*b*)). In other words, only five digital values in each data packet are "new" values. Another data packet subsequent to data packet 352 (not shown) may have, in addition to five new data values, the same five digital values D5–D9 of FIG. 11(*b*). If one of these data packets is lost, the common group of digital values may be recovered from the other data packet by the receiving device, e.g., the local processor or a receiving circuit associated With the force feedback device.

Of course the amount of overlap (in this case 5) as well as the number of digital values per data packet may be varied depending on needs. For example, the number of overlapped data values may be increased, to 9 for example, to ensure that no transmitted digital value is lost even if multiple consecutive data packets are compromised. The use of overlapped data packets may,. in some case, render bi-directional communication protocols, e.g., for error-checking purposes, unnecessary since a transmitted data value is included in more than one data packet and given more than one chance to be transmitted properly. This technique may substantially reduce or even eliminate the need for the receiving device to inform the transmitting device whether a particular data value has been properly transmitted or requires re-transmission.

While this invention has been described in terms of several preferred embodiments, it is contemplated that alterations, permutations, and equivalents thereof will become apparent to those skilled in the art upon a reading of the specification and study of the drawings. For example, a wide variety of types and models of forces can be transmitted to a user through the force feedback device when using the present invention. In addition, the application of reflex processes on a local microprocessor can be implemented in a variety of ways. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method, comprising:
   sending a source wave;
   sending a set of values associated with control parameters, said control parameters including at least one of a steady-state magnitude value, a frequency value, and a duration value associated with the source wave, the steady-state magnitude value associated with a steady-state magnitude of the source wave, the frequency value associated with a frequency of the source wave, the duration value associated with a duration of output of haptic feedback;
   sending impulse parameters, including:
   an impulse value, the impulse value associated with an impulse force level of the source wave, the value of the impulse force level being different from the value of the steady-state magnitude;
   a settle time, the settle time associated with a time for a magnitude of the force signal to change from the impulse force level to the value of the steady-state magnitude; and
   sending a force signal, the force signal based on the source wave, the set of control parameters, and the set of impulse parameters, the haptic feedback being based on the force signal.

2. The method of claim 1, wherein the haptic feedback is output via at least one actuator.

3. The method of claim 1, wherein the source wave includes one of a constant profile, a sine wave, a square wave, a triangular wave, and a force profile.

4. The method of claim 1, wherein the data values associated with the force signal are time-varying data values.

5. The method of claim 1, wherein the impulse value is higher than the steady-state magnitude value, the settle time associated with a time for a magnitude of the force signal to decay from the value of the impulse force level to the value of the steady-state magnitude.

6. The method of claim 1, wherein the settle time is less than one order of magnitude faster than a steady-state time associated with a duration of the steady-state magnitude.

7. The method of claim 1, wherein the force signal is generated at the steady-state magnitude value after an expiration of the settle time.

8. The method of claim 1, wherein the force wave is terminated based on the duration value.

9. The method of claim 1, further comprising sending a value for each application parameter from a set of application parameters, said application parameters specifying a vector of the force signal.

10. The method of claim 1, further comprising sending a set of trigger parameters, the set of trigger parameters specifying a generation of the haptic feedback based on an activation of a switch of a haptic feedback device.

11. The method of claim 10, further comprising outputting the haptic feedback based on the value of each trigger parameter from the set of trigger parameters, the trigger parameters being based on actuation of switches of a haptic feedback device.

12. A device, comprising:
a sensor configured to detect a position of a user object, the user object movable by a user, and to output a position signal associated with a position of the user object;
a local microprocessor configured to communicate with a host computer, the local microprocessor configured to output an impulse-shaped force signal; and
an actuator electrically coupled to the local microprocessor and configured to receive the impulse-shaped force signal, the actuator configured to output haptic feedback based on the impulse-shaped force signal, the haptic feedback including a first magnitude at a time and a second magnitude at a time different from the time of the first magnitude, the second magnitude being different from the first magnitude.

13. The device of claim 12, wherein the local microprocessor is configured to receive the impulse-shaped force signal from a host processor of the host computer, the local microprocessor being configured to relay the impulse-shaped force signal to the actuator.

14. The device of claim 12, wherein the local microprocessor is configured to receive a source wave from the host computer and adjust the source wave to provide the impulse-shaped force signal to the actuator.

15. The device of claim 14, wherein the local microprocessor is configured to add a value of a control parameter and a value of an impulse parameter to the source wave to provide the impulse-shaped force signal, the value of the control parameter being operative to modify a frequency and a magnitude of the impulse-shaped force signal, the value of the impulse parameter being operative to modify the value of the magnitude of the impulse-shaped force signal.

16. The device of claim 15, wherein the value of the control parameter is operative to modify a duration and a DC voltage offset of the impulse-shaped force signal.

17. The device of claim 15, wherein the value of the impulse parameter is operative to modify an impulse magnitude and a settle time.

18. The device of claim 15, wherein the impulse-shaped force signal further includes an application parameter operative to indicate a direction of the haptic feedback.

19. The device of claim 15, further comprising at least one button coupled to the user object, the impulse-shaped signal further including a trigger value to indicate which buttons are associated with the output of the haptic feedback generated by the impulse-shaped signal.

20. The device of claim 14, further comprising a local memory coupled to the local microprocessor, the local memory configured to store a digital representation of the impulse-shaped force signal.

21. The device of claim 12, wherein the impulse-shaped force signal is one of a condition and an effect, the condition being based on a position of the user object, the effect being independent of the position of the user object.

22. The device of claim 12, wherein the host computer is configured to display a plurality of images on a visual output device and manipulate the plurality of images based on the sensor signals.

23. A method, comprising:
receiving a set of values associated with control parameters, said control parameters including at least one of a steady-state magnitude value, a frequency value, and a duration value for a source wave, the steady-state magnitude value associated with a steady-state magnitude of the source wave, the frequency value associated with a frequency of the source wave, the duration value associated with a duration of output of haptic feedback;
receiving a set of impulse parameters, including:
an impulse value, the impulse value associated with an impulse force level of the source wave, the value of the impulse force level being different from the steady-state magnitude value;
a settle time, the settle time associated with a time required for a magnitude of the force signal to change from the impulse force level to the steady-state magnitude value; and
receiving a force signal, the force signal based on the source wave, the set of control parameters, and the set of impulse parameters, the haptic feedback being based on the force signal.

24. The method of claim 23, wherein the source wave, the control parameters, and the impulse parameters are received from a host computer, the force signal being generated by a local microprocessor different from the host computer.

25. The method of claim 23, wherein the haptic feedback is output by an actuator.

26. The method of claim 23, wherein the impulse value is higher than the steady-state magnitude value, the settle time associated with a required for a magnitude of the force signal to decay from the impulse force value to the steady-state value.

27. The method of claim 23, wherein the force signal is generated at the steady-state value after an expiration of the settle time.

28. The method of claim 23, wherein the source wave includes one of a constant profile, a sine wave, a square wave, a triangular wave, and a stored force profile, the force profile being stored on a local memory device.

29. The method of claim 23, wherein the steady-state magnitude value is included in the set of control parameters, the steady-state magnitude value being a specified percentage of a maximum force output of an actuator.

30. The method of claim 23, wherein the settle time is at most about one-tenth of a duration of the steady-state magnitude value.

31. A device, comprising:
a user object, the user object movable by a user;
a sensor configured to detect a position of the user object and output a position signal, the position signal being based on the position of the user object; and
an actuator configured to receive an impulse-shaped force signal, said actuator configured to apply a force to the user object in accordance with the impulse-shaped force signal such that a force having an impulse magnitude value at a time, followed by a steady-state magnitude value different from the impulse magnitude value at a time different from the time associated with the impulse magnitude value, is applied to said user object.

32. The device of claim 31, further comprising a local microprocessor coupled to the actuator and configured to communicate with a host computer, the local microprocessor being configured to receive parameters from the host computer, generate the impulse-shaped force signal based on a source wave received from the host computer, and output the impulse-shaped force signal to the actuator.

33. The device of claim 31, wherein the steady-state magnitude value is lower than the impulse magnitude value.

* * * * *